US011463875B2

(12) United States Patent
Lee et al.

(10) Patent No.: US 11,463,875 B2
(45) Date of Patent: Oct. 4, 2022

(54) DETECTION OF SYSTEM INFORMATION MODIFICATION USING ACCESS STRATUM SECURITY MODE COMMAND

(71) Applicant: QUALCOMM Incorporated, San Diego, CA (US)

(72) Inventors: Soo Bum Lee, San Diego, CA (US); Adrian Edward Escott, Reading (GB); Anand Palanigounder, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 16/856,467

(22) Filed: Apr. 23, 2020

(65) Prior Publication Data
US 2020/0344605 A1     Oct. 29, 2020

Related U.S. Application Data

(60) Provisional application No. 62/839,500, filed on Apr. 26, 2019.

(51) Int. Cl.
*H04W 12/06* (2021.01)
*H04W 12/106* (2021.01)
*H04W 76/27* (2018.01)

(52) U.S. Cl.
CPC ......... *H04W 12/06* (2013.01); *H04W 12/106* (2021.01); *H04W 76/27* (2018.02)

(58) Field of Classification Search
CPC . H04W 12/06; H04W 12/106; H04W 12/122; H04W 76/27
See application file for complete search history.

(56) References Cited

U.S. PATENT DOCUMENTS 9,412,278 B1  8/2016 Gong et al.
2007/0032249 A1  2/2007 Krishnamurthi et al.
(Continued)

OTHER PUBLICATIONS

3rd Generation Partnership Project, Technical Specification Group Services and System Aspects; Study on 5G Security Enhancement against False Base Stations, Mar. 2019, 3GPP, Release 16, Chapter 6 (Year: 2019).*

(Continued)

*Primary Examiner* — Ashokkumar B Patel
*Assistant Examiner* — William B Jones
(74) *Attorney, Agent, or Firm* — Holland & Hart LLP

(57) ABSTRACT

A user equipment (UE) may receive system information from a base station and may calculate a hash value using the system information as input to a hashing function. Similarly, prior to transmitting the system information, a valid base station may calculate a hash value using the system information as input to a hashing function. The base station may transmit the calculated hash value (e.g., which represent or be included in a set of hash values) to the UE in an access stratum (AS) security mode command (SMC) message. The UE may determine whether the received system information was modified based on the hash value (e.g., by comparing the UE calculated hash value and the set of hash values received from the base station in the AS SMC). If the UE indicates a mismatch of hash information, the base station may re-transmit the system information (e.g., in an integrity protected message).

66 Claims, 19 Drawing Sheets

(56) References Cited

U.S. PATENT DOCUMENTS

| | | | |
|---|---|---|---|
| 2008/0039096 A1 | 2/2008 | Forsberg | |
| 2008/0076425 A1* | 3/2008 | Khetawat | H04W 12/069 455/436 |
| 2009/0199272 A1 | 8/2009 | Gopalakrishna | |
| 2010/0211790 A1 | 8/2010 | Zhang | |
| 2013/0083691 A1 | 4/2013 | Murphy et al. | |
| 2015/0215777 A1 | 7/2015 | Sirotkin et al. | |
| 2015/0334566 A1* | 11/2015 | Selander | H04W 4/14 455/411 |
| 2018/0046824 A1 | 2/2018 | Rajadurai | |
| 2018/0070238 A1 | 3/2018 | Agarwal et al. | |
| 2018/0124697 A1 | 5/2018 | Nair et al. | |
| 2018/0167918 A1 | 6/2018 | Ishii | |
| 2018/0376411 A1 | 12/2018 | Rinne et al. | |
| 2019/0182286 A1 | 6/2019 | Zini | |
| 2019/0191483 A1 | 6/2019 | Ryoo et al. | |
| 2019/0268759 A1* | 8/2019 | Targali | H04W 8/18 |
| 2019/0349765 A1 | 11/2019 | Kolekar et al. | |
| 2020/0162925 A1 | 5/2020 | Miao et al. | |
| 2020/0236554 A1 | 7/2020 | Lee et al. | |

OTHER PUBLICATIONS

3rd Generation Partnership Project, Measurement Report Requirement When UE in RRC-CONNECTED, Mar. 11-15, 2019, 3GPP, pp. 1-2 (Year: 2019).*

3rd Generation Partnership Project; Technical Specification Group Services and System Aspects; Study on the Security Aspects of the Next Generation System (Release 14), 3GPP Standard; S3-172095, Technical Report; 3GPP TR 33.899, 3rd Generation Partnership Project (3GPP), Mobile Competence Centre; 650, Route Des Lucioles; F-06921 Sophia-Antipolis Cedex; France, vol. SA WG3, No. v1.3.0, Aug. 21, 2017, 605 pages, XP051450230,Retrieved from the Internet: URL: http://www.3gpp.org/ftp/tsg_sa/WG3_Security/TSGS3_88_Dali/Docs/ [retrieved on Aug. 21, 2017] the whole document.

Intel Corporation: "Discussion on Security Issues with RRC Reject for Inactive Mode", 3GPP Draft, 3GPP TSG SA WG3 (Security) Meeting #89, S3-173211_DISCUSSIONRRCREJECTWAIT-TIMER, 3rd Generation Partnership Project (3GPP), Mobile Competence Centre, 650, Route Des Lucioles, F-06921 Sophia-Antipolis Cedex, France, vol. SA WG3, No. Reno USA, Nov. 27, 2017-Dec. 1, 2017, Nov. 20, 2017 (Nov. 20, 2017), XP051380467, 2 Pages, Retrieved from the Internet: URL: http://www.3gpp.org/ftp/tsg%5Fsa/WG3%5FSecurity/TSGS3%5F89%5FReno/Docs/, [retrieved on Nov. 20, 2017], the whole document.

LG Electronics: "Verification of System Information", 3GPP Draft, 3GPP TSG SA WG3 #46, S3-070075 Verification of System Information, 3rd Generation Partnership Project (3GPP), Mobile Competence Centre, 650, Route Des Lucioles, F-06921 Sophia-Antipolis Cedex, France, vol. SA WG3, No. Beijing, China, Feb. 13, 2007-Feb. 16, 2007, Feb. 9, 2007 (Feb. 9, 2007), XP050635364, pp. 1-6, [retrieved on Feb. 9, 2007], the whole document.

Huawei., et al., "Measurement Report Requirement when UE in RRC-CONNECTED,",3GPP Draft; 3GPP TSG SA WG3 (Security) Meeting #94 ad-hoc, S3-190671, 3rd Generation Partnership Project (3GPP), Mobile Competence Centre, 650, Route Des Lucioles, F-06921, Sophia-Antipolis Cedex, France, vol. SA WG3, No. Kista (Sweden); Mar. 11, 2019-Mar. 15, 2019, Mar. 4, 2019 (Mar. 4, 2019), XP051697606, 2 pages, Retrieved from the Internet:URL: http://www.3gpp.org/ftp/tsg%5Fsa/WG3%5FSecurity/TSGS3%5F94AH%5FKista/Docs/S3%2D190671%2Ezip [retrieved on Mar. 4, 2019]the whole document.

International Search Report and Written Opinion—PCT/US2020/029773—ISA/EPO—dated Jul. 24, 2020 (192399WO).

Qualcomm Incorporated: "Shared Key Based MIB/SIBs Integrity Information Provided by gNB", 3GPP Draft, 3GPP TSG SA WG3 (Security) Meeting #96, S3-192936, 3rd Generation Partnership Project (3GPP), Mobile Competence Centre, 650, Route Des Lucioles, F-06921, Sophia-Antipolis Cedex, France, vol. SA WG3, No. Wroclaw (Poland), Aug. 26, 2019-Aug. 30, 2019, Aug. 19, 2019 (Aug. 19, 2019), XP051776769, 3 pages, Retrieved from the Internet: URL: http://www.3gpp.org/ftp/tsg_sa/WG3_Security/TSGS3_96_Wroclaw/Docs/S3-192936.zip [retrieved on Aug. 19, 2019] the whole document.

* cited by examiner

DETECTION OF SYSTEM INFORMATION MODIFICATION USING ACCESS STRATUM SECURITY MODE COMMAND

CROSS REFERENCE

The present Application for Patent claims the benefit of U.S. Provisional Patent Application No. 62/839,500 by LEE et al., entitled "DETECTION OF SYSTEM INFORMATION MODIFICATION USING ACCESS STRATUM SECURITY MODE COMMAND," filed Apr. 26, 2019, assigned to the assignee hereof, and expressly incorporated by reference herein.

BACKGROUND

The following relates generally to wireless communications, and more specifically to detection of system information modification using access stratum (AS) security mode command (SMC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may process a number of messages (e.g., broadcast messages, unicast messages, etc.) prior to setting up a security context with the network. These messages may be referred to as "unprotected" messages, as these messages received prior to establishing the security context may lack protection via ciphering, integrity protection, or both. In some cases, a UE may connect to and receive unprotected messages from a "fake" base station. A "fake" base station may refer to a wireless device acting as if it is part of a network despite not being verified by the network. In some examples, the fake base station may launch different types of attacks against the UE using these unprotected messages (e.g., by modifying downlink messages from a base station verified by the network). These attacks may degrade performance at the UE, deny service to the UE, prevent the UE from receiving important information, cause roaming issues at the UE, or result in any combination of these or other problems based on malicious modifications by the fake base station to information contained in one or more unprotected messages.

SUMMARY

The described techniques relate to improved methods, systems, devices, and apparatuses that support detection of system information modification using access stratum (AS) security mode command (SMC). Generally, the described techniques provide for a user equipment (UE) to determine the authenticity of information (e.g., system information) received in an unprotected message (e.g., a message not protected via ciphering, integrity protection, or both). In some wireless communications systems, a base station verified by a network may transmit a first set of information to a UE in an unprotected message. If a fake base station intercepts and modifies the message before relaying the message to the UE, the UE may receive different information (e.g., a second set of information) than the transmitted first set of information. The UE and verified base station may complete a security setup procedure between the UE and verified base station, during which any system information modification (e.g., by an attacker or fake base station) may be detected.

For example, a UE may receive system information from a base station and may calculate a hash value using the system information as input to a hashing function. Similarly, prior to transmitting the system information, a valid base station may calculate a hash value using the system information as input to a hashing function. The base station may transmit the calculated hash value (e.g., which represent or be included in a set of hash values) to the UE in an AS SMC message. In some cases, the base station may calculate a hash value for a limited set of system information (e.g., essential SIBs, such as MIB and SIB1/2), as the base station may not know which SIB(s) the UE is to read. The UE may determine whether the received system information was modified based on the hash value (e.g., by comparing the UE calculated hash value and the set of hash values received from the base station in the AS SMC). In cases where the UE indicates a mismatch of hash information (e.g., in cases where the UE indicates, via an AS security mode complete message, that system information may have been modified or corrupted), the base station may re-transmit the system information (e.g., in an integrity protected RRC reconfiguration message).

A method of wireless communication at a UE is described. The method may include receiving, from a base station, a protected message including a set of hash values corresponding to one or more sets of information. The method may further include receiving a first set of information at the UE, the first set of information for the UE to use to communicate with a network, and determining a hash value for the received first set of information. The method may further include determining authenticity of the received first set of information based on a comparison of the determined hash value and a first hash value of the set of hash values received from the base station (e.g., the first hash value corresponding to the first set of information), and transmitting, to the base station, an indication of the determined authenticity.

An apparatus for wireless communication at a UE is described. The apparatus may include a processor, memory in electronic communication with the processor, and instructions stored in the memory. The instructions may be executable by the processor to cause the apparatus to receive, from a base station, a protected message including a set of hash values corresponding to one or more sets of information, and receive a first set of information at the UE, the first set of information for the UE to use to communicate with a network. The instructions may be executable by the processor to further cause the apparatus to determine a hash value for the received first set of information, determine an authenticity of the received first set of information based on a comparison of the determined hash value and a first hash value of the set of hash values received from the base station (e.g., the first hash value corresponding to the first set of information), and transmit, to the base station, an indication of the determined authenticity.

Another apparatus for wireless communication at a UE is described. The apparatus may include means for receiving, from a base station, a protected message including a set of hash values corresponding to one or more sets of information, and receiving a first set of information at the UE, the first set of information for the UE to use to communicate with a network. The apparatus may further include means for determining a hash value for the received first set of information, determining an authenticity of the received first set of information based on a comparison of the determined hash value and a first hash value of the set of hash values received from the base station (e.g., the first hash value corresponding to the first set of information), and transmitting, to the base station, an indication of the determined authenticity.

A non-transitory computer-readable medium storing code for wireless communication at a UE is described. The code may include instructions executable by a processor to receive, from a base station, a protected message including a set of hash values corresponding to one or more sets of information, and receive a first set of information at the UE, the first set of information for the UE to use to communicate with a network. The code may include instructions further executable by a processor to determine a hash value for the received first set of information, determine an authenticity of the received first set of information based on a comparison of the determined hash value and a first hash value of the set of hash values received from the base station (e.g., the first hash value corresponding to the first set of information), and transmit, to the base station, an indication of the determined authenticity.

In some examples of the method, apparatuses, and non-transitory computer-readable medium described herein, transmitting the indication of the determined authenticity may include operations, features, means, or instructions for transmitting, to the base station, an indication of a matching hash value based on the comparison. Some examples of the method, apparatuses, and non-transitory computer-readable medium described herein may further include operations, features, means, or instructions for communicating with the network based on the received first set of information. In some examples of the method, apparatuses, and non-transitory computer-readable medium described herein, transmitting the indication of the determined authenticity may include operations, features, means, or instructions for transmitting, to the base station, an indication of mismatching hash values based on the comparison.

Some examples of the method, apparatuses, and non-transitory computer-readable medium described herein may further include operations, features, means, or instructions for receiving a corrected set of information in response at least in part to the transmitted indication, and communicating with the network based on the corrected set of information. In some examples of the method, apparatuses, and non-transitory computer-readable medium described herein, the corrected set of information may be protected via ciphering, integrity protection, or a combination thereof. In some examples of the method, apparatuses, and non-transitory computer-readable medium described herein, the corrected set of information may be received in a radio resource control re-configuration message.

In some examples of the method, apparatuses, and non-transitory computer-readable medium described herein, the indication of mismatching hash values may be transmitted in an access stratum security mode complete message. Some examples of the method, apparatuses, and non-transitory computer-readable medium described herein may further include operations, features, means, or instructions for transmitting, to the base station, a radio resource control setup message including a registration request or a service request, where the set of hash values may be received in response at least in part to the registration request or the service request.

Some examples of the method, apparatuses, and non-transitory computer-readable medium described herein may further include operations, features, means, or instructions for performing an authentication procedure with the network based on the transmitted radio resource control setup message, where the set of hash values may be received based on the performed authentication procedure. In some examples of the method, apparatuses, and non-transitory computer-readable medium described herein, determining the authenticity of the received first set of information further may include operations, features, means, or instructions for comparing the determined hash value and the first hash value of the set of hash values received from the base station based on a freshness parameter associated with the received first set of information.

Some examples of the method, apparatuses, and non-transitory computer-readable medium described herein may further include operations, features, means, or instructions for identifying the first hash value of the set of hash values received from the base station based at least in part on the received first set of information. In some examples of the method, apparatuses, and non-transitory computer-readable medium described herein, the first hash value comprises a single hash value corresponding to the received first set of information, the received first set of information comprising a single system information block. In some examples of the method, apparatuses, and non-transitory computer-readable medium described herein, the first hash value comprises a single hash value corresponding to the received first set of information, the received first set of information comprising at least two system information blocks.

Some examples of the method, apparatuses, and non-transitory computer-readable medium described herein may further include operations, features, means, or instructions for identifying a second hash value of the set of hash values received from the base station based at least in part on the received first set of information, wherein the first hash value corresponds to a first system information block of the received first set of information and the second hash value corresponds to a second system information block of the received first set of information In some examples of the method, apparatuses, and non-transitory computer-readable medium described herein, receiving the set of hash values from the base station further may include operations, features, means, or instructions for receiving an access stratum security mode command comprising the set of hash values corresponding to the one or more sets of information.

Some examples of the method, apparatuses, and non-transitory computer-readable medium described herein may further include operations, features, means, or instructions for receiving a non-access stratum message, where the set of hash values corresponding to one or more sets of information may be received based on the received non-access stratum message. In some examples of the method, apparatuses, and non-transitory computer-readable medium described herein, the non-access stratum message includes a registration accept message.

Some examples of the method, apparatuses, and non-transitory computer-readable medium described herein may further include operations, features, means, or instructions for receiving a service accept message, where the set of hash values corresponding to one or more sets of information may be received based on the received service accept message. Some examples of the method, apparatuses, and non-transitory computer-readable medium described herein may further include operations, features, means, or instructions for performing a random access message exchange with the base station, and transmitting a registration request or a service request to the base station following the random access message exchange, where the set of hash values may be received in response at least in part to the registration request or the service request.

Some examples of the method, apparatuses, and non-transitory computer-readable medium described herein may further include operations, features, means, or instructions for receiving a first radio resource control message in response to the transmitted indication of the determined authenticity, transmitting a second radio resource control message in response to the received first radio resource control message, receiving, from the network, a registration accept message including a UE-specific key for initial access stratum security, and communicating with the network based on the UE-specific key. In some examples of the method, apparatuses, and non-transitory computer-readable medium described herein, the one or more sets of information include a system information block, or a master information block, or a combination thereof.

A method of wireless communication at a base station is described. The method may include identifying one or more sets of information for a UE, determining a set of hash values corresponding to the one or more sets of information, and transmitting a protected message comprising the set of hash values to the UE. The method may further include receiving, from the UE in response to the transmitted protected message comprising the set of hash values, an indication of an authenticity for a first set of information received by the UE.

An apparatus for wireless communication at a base station is described. The apparatus may include a processor, memory in electronic communication with the processor, and instructions stored in the memory. The instructions may be executable by the processor to cause the apparatus to identify one or more sets of information for a UE, determine a set of hash values corresponding to the one or more sets of information, and transmit a protected message comprising the set of hash values to the UE. The instructions may be further executable by the processor to cause the apparatus to receive, from the UE in response to the transmitted protected message comprising the set of hash values, an indication of an authenticity for a first set of information received by the UE.

Another apparatus for wireless communication at a base station is described. The apparatus may include means for identifying one or more sets of information for a UE, determining a set of hash values corresponding to the one or more sets of information, and transmitting a protected message comprising the set of hash values to the UE. The apparatus may further include means for receiving, from the UE in response to the transmitted protected message comprising the set of hash values, an indication of an authenticity for a first set of information received by the UE.

A non-transitory computer-readable medium storing code for wireless communication at a base station is described. The code may include instructions executable by a processor to identify one or more sets of information for a UE, determine a set of hash values corresponding to the one or more sets of information, and transmit a protected message comprising the set of hash values to the UE. The code may include instructions further executable by a processor to receive, from the UE in response to the transmitted protected message comprising the set of hash values, an indication of an authenticity for a first set of information received by the UE.

In some examples of the method, apparatuses, and non-transitory computer-readable medium described herein, receiving the indication of the authenticity may include operations, features, means, or instructions for receiving, from the UE, an indication of a matching hash value between the first set of information and the set of hash values.

Some examples of the method, apparatuses, and non-transitory computer-readable medium described herein may further include operations, features, means, or instructions for communicating with the UE according to the first set of information. In some examples of the method, apparatuses, and non-transitory computer-readable medium described herein, receiving the indication of the authenticity may include operations, features, means, or instructions for receiving, from the UE, an indication of mismatching hash values between the first set of information and the set of hash values. Some examples of the method, apparatuses, and non-transitory computer-readable medium described herein may further include operations, features, means, or instructions for transmitting a corrected set of information based on the indication of mismatching hash values, and communicating with the UE according to the corrected set of information.

In some examples of the method, apparatuses, and non-transitory computer-readable medium described herein, the corrected set of information may be protected via ciphering, integrity protection, or a combination thereof. In some examples of the method, apparatuses, and non-transitory computer-readable medium described herein, the corrected set of information may be transmitted in a radio resource control re-configuration message. In some examples of the method, apparatuses, and non-transitory computer-readable medium described herein, the indication of mismatching hash values may be received in an access stratum security mode complete message.

Some examples of the method, apparatuses, and non-transitory computer-readable medium described herein may further include operations, features, means, or instructions for receiving, from the UE, a radio resource control setup message including a registration request or a service request, where the set of hash values may be transmitted to the UE in response at least in part to the registration request or the service request.

Some examples of the method, apparatuses, and non-transitory computer-readable medium described herein may further include operations, features, means, or instructions for transmitting the registration request or the service request to the network, receiving, from the network, a UE-specific key based on the transmitted registration request or the transmitted service request, and performing a security establishment procedure with the UE, where the set of hash values may be transmitted based on the performed security establishment procedure.

Some examples of the method, apparatuses, and non-transitory computer-readable medium described herein may further include operations, features, means, or instructions for transmitting a non-access stratum message, where the set of hash values may be transmitted based on the transmitted non-access stratum message. In some examples of the method, apparatuses, and non-transitory computer-readable medium described herein, the non-access stratum message includes a registration accept message. Some examples of the method, apparatuses, and non-transitory computer-readable medium described herein may further include operations, features, means, or instructions for transmitting a service accept message, where the set of hash values may be transmitted based on the transmitted service accept message.

Some examples of the method, apparatuses, and non-transitory computer-readable medium described herein may further include operations, features, means, or instructions for performing a random access message exchange with the UE, and receiving a registration request or a service request from the UE following the random access message exchange, where the set of hash values may be transmitted in response at least in part to the registration request or the service request.

Some examples of the method, apparatuses, and non-transitory computer-readable medium described herein may further include operations, features, means, or instructions for transmitting a first radio resource control message in response to the received indication of the authenticity, receiving a second radio resource control message in response to the transmitted first radio resource control message, transmitting a registration accept message including a UE-specific key for initial access stratum security, and communicating with the UE based on the UE-specific key. In some examples of the method, apparatuses, and non-transitory computer-readable medium described herein, the one or more sets of information include one or more system information blocks, a master information block, or a combination thereof.

In some examples of the method, apparatuses, and non-transitory computer-readable medium described herein, determining the set of hash values corresponding to the one or more sets of information further may include operations, features, means, or instructions for determining a first hash value of the set of hash values that corresponds to a first set of information, the first set of information comprising a first system information block. In some examples of the method, apparatuses, and non-transitory computer-readable medium described herein, determining the set of hash values corresponding to the one or more sets of information further may include operations, features, means, or instructions for determining a second hash value of the set of hash values that corresponds to a second set of information, the second set of information comprising a second system information block. In some examples of the method, apparatuses, and non-transitory computer-readable medium described herein, determining the set of hash values corresponding to the one or more sets of information further may include operations, features, means, or instructions for determining a first hash value of the set of hash values that corresponds to a first set of information, the first set of information comprising at least two system information blocks.

In some examples of the method, apparatuses, and non-transitory computer-readable medium described herein, transmitting a protected message comprising the set of hash values to the UE further may include operations, features, means, or instructions for transmitting an access stratum security mode command to the UE, the access stratum security mode command comprising the set of hash values corresponding to the one or more sets of information.

DETAILED DESCRIPTION

Figure 1:
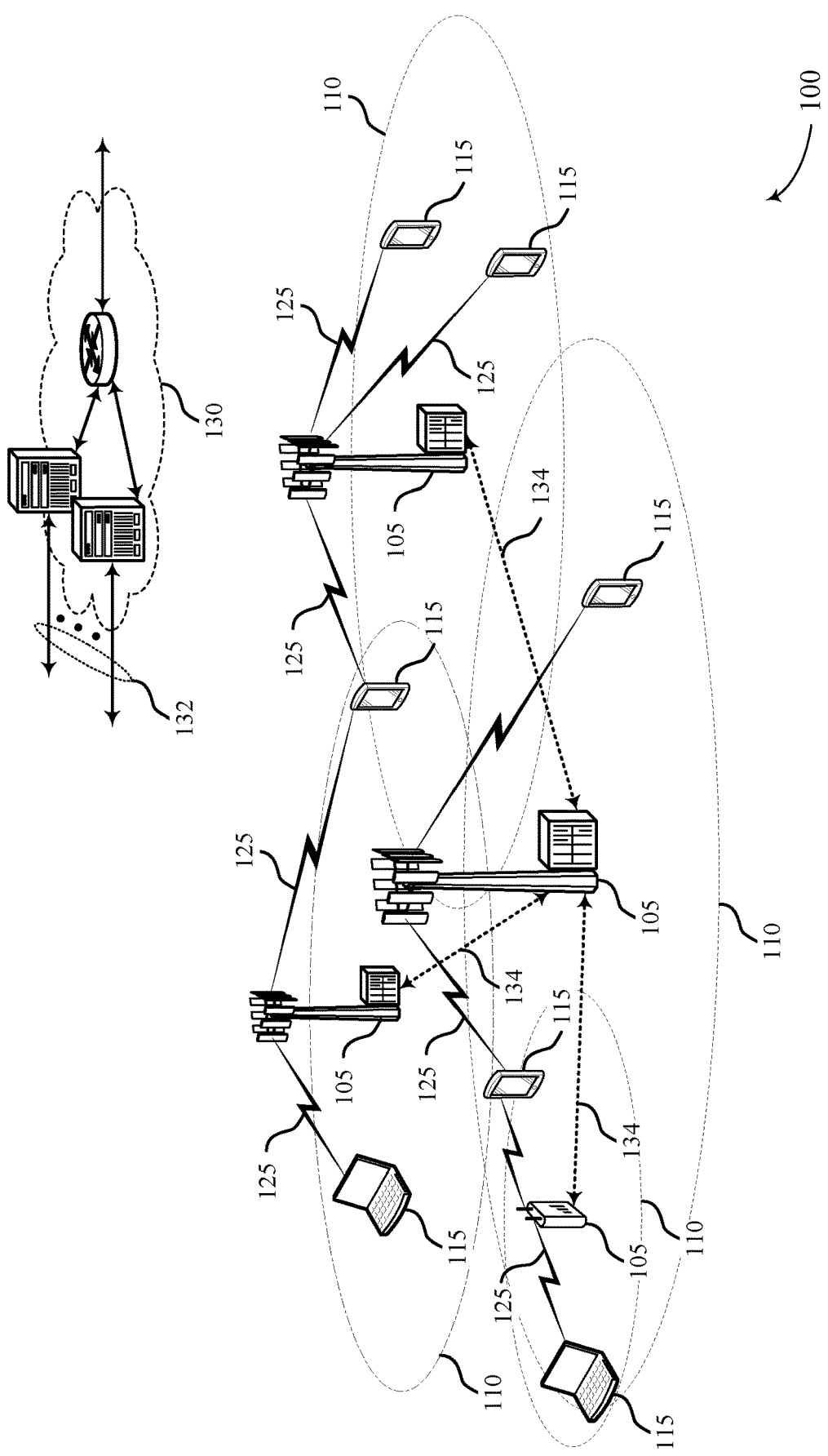
FIGS. 1 and 2 illustrate examples of wireless communications that support detection of system information modification using access stratum (AS) security mode command (SMC) in accordance with aspects of the present disclosure.

In some wireless communications systems (e.g., New Radio (NR) systems), a user equipment (UE) may process a number of messages prior to setting up a secure connection with a base station. These messages may be referred to as "unprotected" messages, as the messages lack protection via ciphering, integrity protection, or both. In some cases, a "fake" base station (e.g., a wireless device acting like a base station of a network) may use these unprotected messages to launch one or more attacks on the UE. For example, if the UE begins a connection procedure with the fake base station, the fake base station may modify one or more of these unprotected messages sent by a real (e.g., verified) base station of the network. The modifications to a message (e.g., a message including system information for the UE) may degrade performance at the UE, deny service to the UE, prevent the UE from receiving important information, cause roaming issues at the UE, or result in any combination of these or other problems for the UE when attempting to connect to the network via the fake base station.

To support authentication of information (e.g., system information) at a UE, the UE may, using the techniques described herein, determine whether received information was modified by a fake base station prior to reception by the UE (e.g., prior to the UE establishing a security context with a network). For example, in some wireless communications systems, a real base station (e.g., a base station verified by the network) may broadcast a first set of information in an unprotected message to a set of UEs in a coverage area. An unregistered UE in the coverage area may receive the first set of information in an unprotected message prior to an authentication procedure. This first set of information may include system information, for example, in the form of a master information block (MIB), one or more system information blocks (SIBs), or some combination of these. If a fake base station intercepts and modifies the message before relaying the message to the UE, the UE may receive different information (e.g., a second set of malicious information transmitted by the fake base station) than the first set of information transmitted by the verified base station.

According to the described techniques, the integrity of system information (e.g., MIB, SIB(s), etc.) received by the UE may be checked during access stratum (AS) security procedures. For example, a UE may determine an authenticity of the received system information (e.g., check the integrity of MIB/SIB(s) that the UE has read to access the network) when the UE establishes AS security with the base station (e.g., during the AS security mode command (SMC) procedure). During an AS SMC procedure, a base station may send a set of hash values corresponding to valid system information (e.g., of previously transmitted MIB/SIB(s)) in an AS SMC message to the UE. As such, the UE may determine a hash value for system information that has been read by the UE, and may determine an authenticity of some read system information by comparing the determined hash value and the at least one hash value (e.g., at least one hash value corresponding to the read system information) of the set of hash values received from the base station in the AS SMC. If system information modification (e.g., MIB/SIB change) is detected by the UE (e.g., by comparing the hash information received in the AS SMC and locally computed hash), the UE may indicate the hash mismatch in an AS security mode complete message. In cases where the UE indicates such a hash mismatch, the base station may then send valid system information (e.g., corrected MIB/SIBs) in a subsequent radio resource control (RRC) reconfiguration message (e.g., which may be both ciphered and integrity protected).

That is, the UE may receive system information from a base station and may calculate a hash value using the system information as input to a hashing function. Similarly, prior to transmitting the system information, a valid base station may calculate a hash value using the system information as input to a hashing function. The base station may transmit the calculated hash value (e.g., which may represent or be included in a set of hash values) to the UE in an AS SMC message. In some cases, the base station may calculate a hash value for a limited set of system information (e.g., essential SIBs, such as MIB and SIB1/2), as the base station may not know which SIB the UE is to read. The UE may determine whether the received system information was modified based on the hash value. In cases where the UE indicates a mismatch of hash information (e.g., in cases where the UE indicates, via an AS security mode complete message, that system information may have been modified or corrupted), the base station may re-transmit the system information (e.g., in an integrity protected RRC reconfiguration message).

As such, a UE may detect any modification of system information (e.g., modification of SIB(s) of interest to the UE) during security setup. Upon detection of system information modification, the UE may request corrected SIB(s) (e.g., from the base station via secure RRC signaling), may select a different cell, etc. The described techniques may be implemented to detect, and in some cases reduce, attacks by fake base stations. A UE may thus more reliably receive service, receive important information, receive valid information, etc. from valid base stations. Further, in some cases, a UE may experience reduced roaming issues. Such may result in improved UE performance, increased user experience, etc. System information integrity check techniques utilizing AS security establishment procedures may further reduce overhead (e.g., that may otherwise be associated with system information authentication) for other signaling between the UE and the base station.

Aspects of the disclosure are initially described in the context of wireless communications systems. Additional aspects of the disclosure are described with reference to process flow examples. Aspects of the disclosure are further illustrated by and described with reference to apparatus diagrams, system diagrams, and flowcharts that relate to detection of system information modification using AS SMC.

FIG. 1 illustrates an example of a wireless communications system 100 that supports detection of system information modification using AS SMC in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, a network may include a number of base stations 105 that are verified by the network. These base stations 105 may be referred to as verified base stations, "real" base stations, authorized base stations, legitimate base stations, or the like. However, other wireless devices may operate within the wireless communications system 100 that are not part of the network. In some cases, these wireless devices may perform operations to appear as if they are part of the network. For example, a device may act as a UE 115 with respect to a real base station 105 in order to obtain a valid subscription to the network through the real base station 105 and may act as a base station 105 with respect to a UE 115 to launch attacks on the UE 115. Such a device may be referred to as a "fake" or "rogue" base station 105, as the device may communicate with one or more UEs 115 as if the device is a real base station 105 of the network. However, the device may modify unprotected messages intended for the UEs 115 to negatively impact performance, throughput, cost, etc. of communications between the UEs 115 and the network.

Wireless communications system 100 may support base stations 105 and UEs 115 protecting information against such attacks by fake base stations. A base station 105 verified by the network may transmit a first set of information to a UE 115 in an unprotected message. If a fake base station intercepts and modifies the message before relaying the message to the UE 115, the UE 115 may receive different information (e.g., a second set of information) than the transmitted first set of information. The UE 115 may then transmit an indication (e.g., a hash value, a request, etc.) of the received second set of information to the verified base station 105 in a protected message. In some cases, based on the indication, the verified base station 105 may re-transmit the first set of information to the UE 115 in a message protected against modification by the fake base station (e.g., using ciphering, integrity protection, etc.). If the UE 115 determines that the initially received information is different from the information received in the protected re-transmission, the UE 115 may identify that the message was modified by a fake base station. Based on this detection of the fake base station, the UE 115 may detach from the fake base station and reattach to a different base station 105 in order to communicate with the network.

Additionally or alternatively, once the UE 115 registers with the network, the network may provision the UE 115 with a UE-specific key for securing initial connection messaging. The UE 115 may use this UE-specific key to security protect an indication of received information during a connection procedure with a base station (e.g., in a random access channel (RACH) request, an RRC connection request, or an RRC connection setup complete message). The network may additional provision verified base stations 105 with information (e.g., a master key, a key index, an encryption algorithm, etc.) that supports decryption of the indication. If the UE 115 is performing the connection procedure with a fake base station, the fake base station may not be able to identify the indication, as the fake base station is not provisioned with the decryption information. A real base station 105 may receive the indication, decrypt the protected message, and determine whether to re-transmit information to the UE 115 in a protected message based on the received indication. The UE 115 may determine inauthentic information and detect a fake base station if the protected information received in the re-transmission is different from the information initially received at the UE 115.

According to some examples of the described techniques, a UE 115 may receive system information from a base station 105 and may calculate a hash value using the system information as input to a hashing function. Similarly, prior to transmitting the system information, a valid base station 105 may calculate a hash value using the system information as input to a hashing function. The valid base station 105 may transmit the calculated hash value (e.g., which represent or be included in a set of hash values) to the UE 115 in an AS SMC message. In some cases, the valid base station 105 may calculate a hash value for a limited set of system information (e.g., essential SIBS, such as MIB and SIB1/2), as the valid base station 105 may not know which SIB the UE 115 is to read. The UE 115 may determine whether the received system information was modified based on the hash value. In cases where the UE 115 indicates a mismatch of hash information (e.g., indicates, via an AS security mode complete message, that system information may have been modified or corrupted), the valid base station 105 may re-transmit the system information (e.g., in an integrity protected RRC reconfiguration message, in response to the indication of mismatching hash information received from the UE 115 in an AS security mode complete message).

Figure 2:
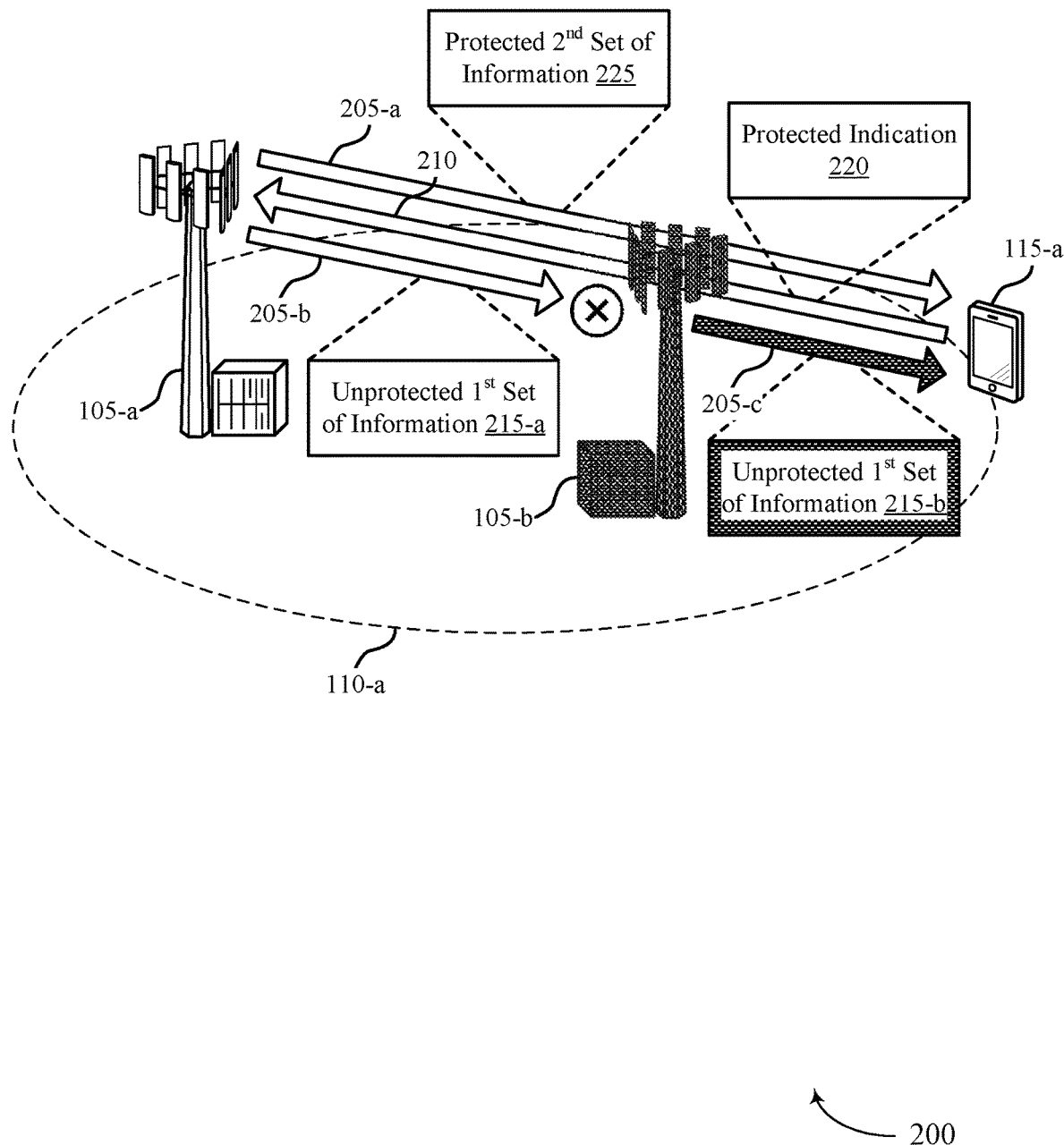

FIG. 2 illustrates an example of a wireless communications system 200 that supports detection of system information modification using AS SMC in accordance with aspects of the present disclosure. Wireless communications system 200 may implement aspects of wireless communications system 100. For example, a wireless communications system 200 may include UE 115-*a* and base station 105-*a*, which may be examples of the devices described with reference to FIG. 1. Base station 105-*a* may serve a cell with a coverage area 110-*a*. Wireless communications system 200 may also include a wireless device that operates as a fake base station 105-*b*. To protect information against attacks from the fake base station 105-*b*, the wireless communications system 200 may implement techniques for authenticating information in unprotected transmissions, supporting detection of fake base stations 105.

In some wireless communications systems, such as wireless communications system 200, a malicious third party user may attempt to breach the security of the system via a fake base station 105-*b*. For example, a fake base station 105-*b* may attempt to bypass system information protections. In cases where a security context is established between a UE 115 (e.g., UE 115-*a*) and a real base station 105 (e.g., base station 105-*a*), one or both of the wireless devices may protect signaling at one or more layers. For example, a device may use encryption, integrity protection, or both to protect information transmitted in the system. However, prior to establishing a security context, certain types of transmissions may be vulnerable to security breaches. To protect against a fake base station 105-*b* making unauthorized modifications to signaling (e.g., system information transmissions in MIBs, SIBs, or both), the wireless communications system 200 may support security enhancements. These security enhancements may prevent certain attacks or scams (e.g., denial of service (DOS) attacks, availability attacks, etc.) by fake base stations 105. Even in cases where a malicious third party user modifies or replicates system information using a fake base station 105-*b*, the security enhancements may prevent the malicious third party from establishing a secure connection between the fake base station 105-*b* and a UE 115-*a* (e.g., due to an initial access procedure or an AS security mode command failing).

Base station 105-*a* may be an example of a real base station 105 verified by the network. Base station 105-*a* may communicate with UE 115-*a* on a downlink channel 205, an uplink channel 210, or both. In some cases, transmissions sent from base station 105-*a* may be received at UE 115-*a* without unauthorized modification. For example, base station 105-*a* may transmit directly to UE 115-*a* on a downlink channel 205-*a*, or a base station 105-*b* may relay information from base station 105-*a* to UE 115-*a* without modification in downlink channel 205-*a*. Similarly, transmissions sent from UE 115-*a* to base station 105-*a* over uplink channel 210 may be received without unauthorized modifications (e.g., via direct transmission or successful relaying). However, in other cases, a fake base station 105-*b* may act as a relay device between verified base station 105-*a* and UE 115-*a*. Fake base station 105-*b* may receive information from base station 105-*a* over downlink channel 205-*b* and may modify the information in a process transparent to both base station 105-*a* and UE 115-*a*. Fake base station 105-*b* may then transmit the modified information to UE 115-*a* over downlink channel 205-*c*, such that UE 115-*a* receives the modified information as if it is the originally transmitted information from base station 105-*a*.

In some cases, UE 115-*a* may connect to a fake base station 105-*b* through a connection procedure. For example, the fake base station 105-*b* may block a first downlink transmission (e.g., on downlink channel 205-*b*) and may send a modified downlink transmission in its place (e.g., on downlink channel 205-*c*). Based on this modified downlink transmission, UE 115-*a* may connect to the fake base station 105-*b*, potentially exposing the UE 115-*a* to attacks. If UE 115-*a* connects to the fake base station 105-*b*, the fake base station 105-*b* may launch different types of attacks against the UE 115-*b* using an unprotected first set of information 215-*b*. For example, this unprotected first set of information 215-*b* may correspond to any number of broadcast or unicast messages processed at the UE 115-*a* before a security setup procedure is complete. As these messages are unprotected (e.g., they lack protection via ciphering, integrity protection, or both), they may be vulnerable to attack by the fake base station 105-*b*.

In other cases, the fake base station 105-*b* may perform a man-in-the-middle attack. In these cases, the fake base station 105-*b* may act as a relay between a verified base station 105-*a* and the UE 115-*a*. In this manner, the fake base station 105-*b* may be able to launch different types of attacks on the UE 115-*a* using messages that the UE 115-*a* identifies as originating from a verified base station 105-*a*. The fake base station 105-*b* may act as a UE 115 to base station 105-*a* to obtain a valid subscription to the network and may act as a base station 105 to UE 115-*a* to connect to the UE 115-*a*. The fake base station 105-*b* may properly or improperly relay messages between base station 105-*a* and UE 115-*a*. For example, the fake base station 105-*b* may properly relay some information to allow UE 115-*a* to configure security with base station 105-*a*, but the fake base station 105-*b* may make unauthorized modifications to any number of unprotected signals transmitted between the devices (e.g., even after security is configured). These unprotected messages may correspond to messages in layers below the PDCP layer, such as the RLC layer, the MAC layer, or the PHY layer.

Potential attacks performed by a fake base station 105-*b* connected to a UE 115-*a* may involve the fake base station 105-*b* transmitting fake or modified system information (e.g., in an inauthentic MIB or set of SIBs) or transmitting other fake or modified unprotected messages to the UE 115-*a* in the unprotected first set of information 215-*b*. A modified MIB or SIB may support various types of DoS attacks (e.g., using a wrong public land mobile network identifier (PLMN-ID), cell barring for a group of UEs 115 using the first SIB (SIB1) or for a specific UE 115 using the second SIB (SIB2), etc.), amplification and/or DOS attacks (e.g., using a fake tracking area code (TAC) to trigger continuous tracking area updates (TAUs), etc.), relay attacks (e.g., location record poisoning via a fake TAC, behavior profiling of a UE 115-*a*, including call information, short message service (SMS) information, data traffic information, etc., blocking downlink messages from the core network to deny service, etc.), or any combination of these or other possible attacks. In some cases, it may be possible for a malicious third party user to inject fake messages into a communication stream without intercepting connection. In some examples, these types of attacks may be more damaging than fake base station attacks.

A fake base station 105-*a* connected to UE 115-*a* may modify various parameters in a MIB to degrade the performance of UE 115-*a*. For example, the fake base station 105-*a* may modify an SFN, a downlink bandwidth, scheduling information, or some combination of these or other parameters in the MIB. Additionally or alternatively, the fake base station 105-*a* may modify various parameters in a SIB. These parameters (e.g., for SIB1) may include, but are not limited to, a PLMN identity list, a TAC, a cell identity, cell barring, a closed subscriber group (CSG) indication, cell selection information, a frequency band indicator, a scheduling information value tag. Modifying one or more of the above indicated fields may cause the UE 115-*a* to fail to select a suitable cell, delay access to a suitable cell, consume excessive battery life, fail to correctly decode system information, perform incorrect operations, and/or perform inefficiently.

For example, a SIB1 (e.g., in an LTE system, an NR system, or any other wireless communications system) may contain access related parameters such as barring information, CSG identity, etc. Different types of systems may refer to similar parameters using different names. If the fake base station 105-*b* modifies any of these parameters for UE 115-*a*, the fake base station 105-*b* may delay or prevent the UE 115-*a* from accessing the cell (e.g., the cell associated with verified base station 105-*a*). In one specific example, by setting the barring bit in an inauthentic SIB1, the fake base station 105-*b* may prevent UE 115-*a* from accessing the cell for a significant period of time (e.g., up to five minutes). Furthermore, modifying the access control parameters may impact connection setup, as improper settings can delay connection setup, degrading service for the UE 115-*a*. Modifying cell selection parameters, which may be broadcast in other SIBs for neighboring UEs 115, may delay or prevent camping by UE 115-*a*. For example, if the fake base station 105-*b* broadcasts a high minimum level for signal quality, multiple UEs 115 may be prevented from camping at a verified base station 105-*a*.

Some systems implement solutions from an AS security perspective to allow UEs 115 operating in an RRC idle mode to detect fake base stations 105 and, accordingly, prevent one or more of the potential fake base station attacks. In a first example, a system may implement digital signatures for system information verification. While the digital signatures may mitigate system information attacks (e.g., replay attacks, DoS attacks, etc.), the size of the protected system information transmission may be much larger than the size of an unprotected system information transmission due to the digital signature and timestamp parameters. Accordingly, systems implementing digital signatures for system information protection may incur a large increase in processing and/or memory overhead. This may result in inefficient communications within the system. In a second example, a system may support UEs 115 verifying fake base stations 105 using "system queries." However, for a "system query" solution to protect system information, a UE 115 may need to communicate with the network despite being in an RRC idle mode. If the UE 115 camps on a false cell during an RRC idle state, the UE 115 may be susceptible to possible DoS or availability attacks. For example, if the UE 115 camps on a fake base station 105, the fake base station 105 may send fake messages to—or stop real messages from reaching—the UE 115, such as public safety warnings, incoming emergency calls, real-time application server push services, proximity services, etc. Some services, like the Earthquake & Tsunami Warning System (ETWS), may be offered to the UE 115 in the RRC idle mode through one or more SIBs. As such, to ensure that the UE 115 receives these services, the UE 115 may not be allowed to camp at a fake base station 105 in RRC idle mode.

From an RRC control plane signalling (e.g., unicast messages, etc.) perspective, there may be unprotected procedures performed before AS security activation, including an RRC connection setup procedure, UE identity acquisition procedure, UE capability information transfer, downlink/uplink information transfer procedure, etc. A fake base station 105 may execute attacks on these signals as well, as malicious attacks in a wireless communications system 100 or 200 may be on any unprotected initial messages between UEs and base stations 105. For example, a fake base station 105 may make unauthorized modifications to signals like attach reject messages (e.g., using enclosure management module (EMM) error codes), tracking area update reject messages, etc., which may be transmitted by a network-verified base station 105 over the air interface prior to AS security activation.

Many possible implementations for AS security during an RRC idle mode result in significant overhead, excessive signaling, unprotected messaging, or some combination of these issues. In one implementation, a network may sign selected signaling messages with a certificate-based signature, an elliptic curve digital signature algorithm (ECDSA), etc. As discussed above, these signature-based solutions may result in significant overhead in the system. In another implementation, a UE 115 may verify the authenticity of a base station 105 during an RRC idle mode. In this implementation, a UE 115 may use a certificate-based signature, an identity-based signature (IBS), or both to verify a base station 105. In some cases, verification may additionally be based on one or more "freshness" parameters (e.g., global positioning system (GPS) values, a coordinated universal time (UTC) time, etc.). Again, such a scheme may result in significant overhead to the system. In yet another implementation, a UE 115 may detect a fake base station 105 using uplink traffic monitoring and system queries. In this implementation, the UE 115 may need to monitor the uplink traffic of nearby UEs within the system. UEs 115 may not support this excessive level of signal monitoring. In yet another implementation, a UE 115 may detect a fake base station 105 using an IBS to protect a redirection message to a 2nd Generation (2G) system. Such an implementation may use a key exchange and mutual verification based on identity-based cryptography (IBC), which may require an exchange of messages between the UE 115 and base station 105. Such an exchange of messages may be susceptible to attacks from a fake base station 105, resulting in security risks within the system. Each of these implementations may be non-ideal solutions for protecting information, such as system information.

In contrast, the wireless communications system 200 may protect initial AS messages, which may result in protection for system information (e.g., MIBs, SIBs, etc.) or other unprotected, lower-layer messages. The wireless communications system 200 may implement a shared key-based approach, which may be more efficient (e.g., resulting in a significantly lower overhead) than implementing signatures for system information protection. The wireless communications system 200 may support protection at UE 115-a against fake base stations 105 modifying unprotected information. For unregistered UEs 115, unauthorized modification detection may occur during an AS security mode command procedure. Registered UEs 115 may improve the detection latency by performing the unauthorized modification detection during a connection procedure (e.g., a RACH procedure or RRC configuration procedure). A verified base station 105-a may determine whether unprotected information was modified (e.g., by a fake base station 105-b) and may re-transmit the correct information in a secure message (e.g., an RRC re-configuration message). Additionally, all unprotected messages transmitted prior to AS security setup may be protected using initial AS protection keys for registered UEs 115.

In some cases, this approach may protect against false negative results when performing fake base station 105 detection. For example, even if UE 115-a connects to fake base station 105-b, UE 115-a may identify if unprotected messages are modified by fake base station 105-b. This may provide a second level of defense for information protection. This cryptographic protection may be implemented alone or in combination with other protection mechanisms (e.g., public or shared key approaches, etc.).

In a specific example, verified base station 105-a may transmit an unprotected first set of information 215-a to UE 115-a over downlink channel 205-b. This unprotected first set of information 215-a may be, for example, a SIB and may lack protection via ciphering, integrity protection, or both. Fake base station 105-b may receive the unprotected first set of information 215-a, but, rather than relaying this information to UE 115-a, the fake base station 105-b may modify the information to obtain unprotected first set of information 215-b. The modified unprotected first set of information 215-b may include one or more modified parameters that degrade performance at UE 115-a. Fake base station 105-b may transmit the modified unprotected first set of information 215-b to UE 115-a over downlink channel 205-c. UE 115-a may receive the modified unprotected first set of information 215-b as if it were relayed correctly through an actual base station 105.

To protect against such an unauthorized modification, UE 115-a may transmit a protected indication to base station 105-a on uplink channel 210. The indication may be protected via ciphering, integrity protection, or both, such that fake base station 105-b may not modify or decode the indication. The indication may indicate the unprotected first set of information 215-b received by UE 115-a. For example, the indication may include an indication of the information received (e.g., in a hash value) or a request for the base station 105-a to re-transmit the information. Base station 105-a may receive the protected indication 220 and may determine the indication (e.g., as base station 105-a is verified by the network, base station 105-a may be provisioned information by the network needed to decode the protected indication). As the originally transmitted unprotected first set of information 215-a was modified by fake base station 105-b, base station 105-a may re-transmit the first set of information. For example, base station 105-a may re-transmit the SIB as a protected second set of information 225 over downlink channel 205-a, where the second set of information is protected via ciphering, integrity protection, or both. Again, because this information is protected, fake base station 105-b may not be capable of reading or modifying the information. UE 115-a may receive the protected second set of information 225 and may compare it to the unprotected first set of information 215-b. If the second set of information is different from the first set, UE 115-a may detect that the unprotected first set of information 215-b was modified (i.e., UE 115-a detects SIB modification) and that the unprotected first set of information 215-b is inauthentic. Based on this detection, UE 115-a may determine that the wireless device acting as a relay base station 105 is a fake base station 105-b, and UE 115-a may detach from the fake base station 105-b. In this way, UE 115-a may efficiently receive the correct, unmodified system information (e.g., in the protected second set of information 225) despite connecting to a fake base station 105-b, while also detecting and detaching from the fake base station 105-b.

As further described below, UE 115-a may read system information (e.g., MIB, SIBS, etc.) and establish a connection with a base station 105. During a security mode command, UE 115-a may receive a set of the hashes of SIBs and the UE 115-a may determine (e.g., compute) the hashes of the received SIBs to verify the authenticity of system information (e.g., by comparing the set of hashes received from the base station 105 and the set of hashes determined by the UE 115-a). In some examples, the set of hash values are received via a protected message (e.g., where the protected message may be integrity protected, ciphered, or any combination thereof). In some cases, the integrity protected message including the set of hash values may be or include an AS SMC. To verify the authenticity of system information, the UE 115-a may compare hashes over the same set of system information. For instance, if the determined hash value is computed over some first set of system information (e.g., including one or more SIBs), the determined hash value may be compared with a hash value (e.g., a first hash value of the set of hashes received from the base station 105) that corresponds to the first set of system information used by the UE 115-a to compute the determined hash value.

Figure 3:
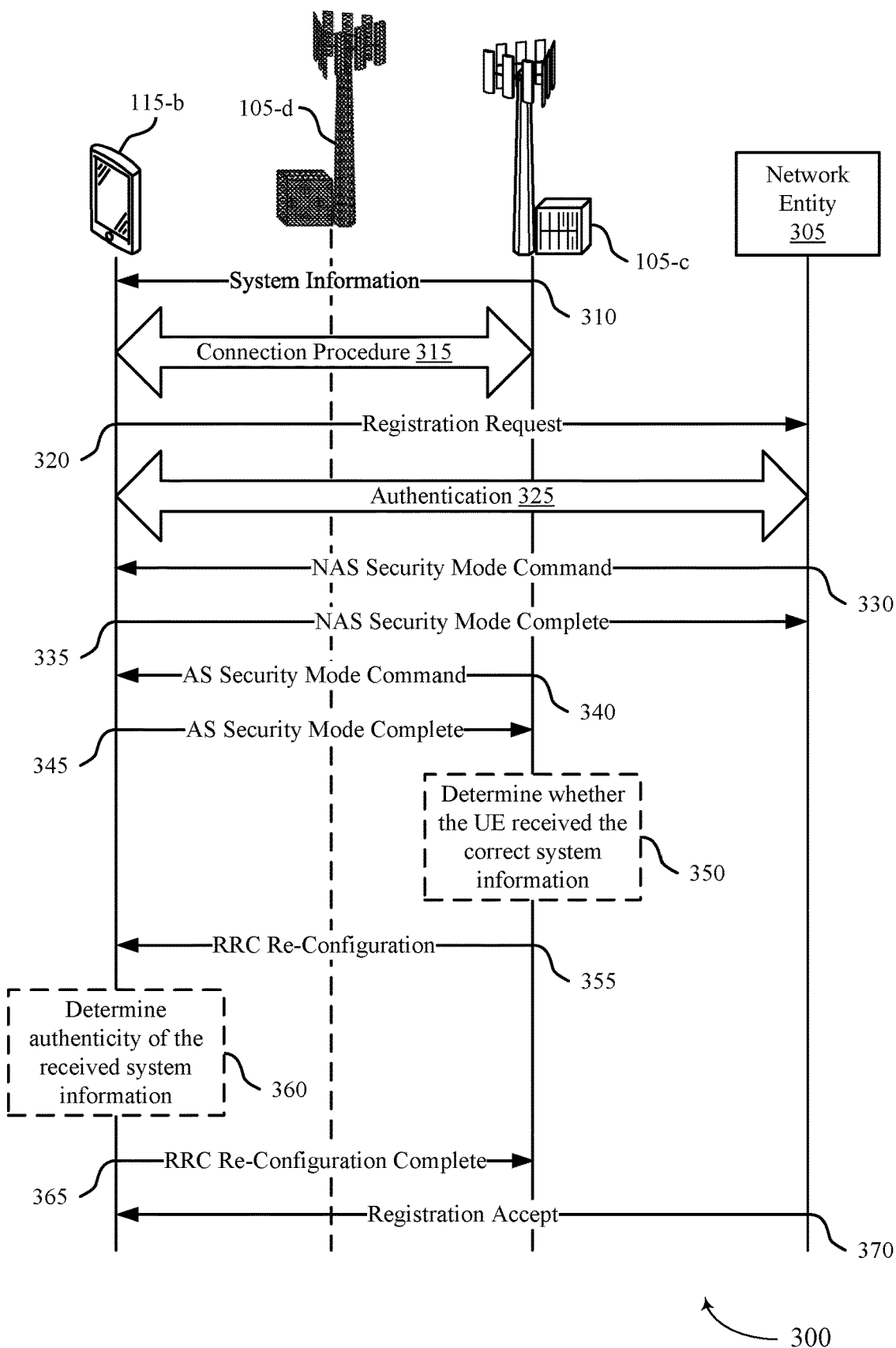
FIG. 3 illustrates an example of a process flow that supports detection of system information modification using AS SMC in accordance with aspects of the present disclosure.

FIG. 3 illustrates an example of a process flow 300 that supports detection of system information modification using AS SMC in accordance with aspects of the present disclosure. The process flow 300 may illustrate an initial network access procedure for an unregistered UE 115 (e.g., a UE 115 without a valid NAS security context). In some examples, the process flow 300 may implement aspects of wireless communications systems 100 and 200. The process flow 300 may include base station 105-c and UE 115-b, which may be examples of the devices described with reference to FIGS. 1 and 2. Base station 105-c may be an example of a real or verified base station of a network. The base station 105-c may communicate with the network via a network entity 305, such as an access and mobility management function (AMF), a security anchor function (SEAF), or some combination of these or other network entities. In some cases, a device may operate as a relay between base station 105-c and UE 115-b. This device may function as a fake base station 105-d. Alternative examples of the following may be implemented, where some steps are performed in a different order than described or are not performed at all. In some cases, steps may include additional features not mentioned below, or further steps may be added.

At 310, UE 115-b may receive a first set of information from base station 105-c. This first set of information may be associated with communicating with a network. For example, the first set of information may include system information in a MIB, a set of SIBs, or a combination thereof. As the UE 115-b has not yet connected to the network or performed an authentication procedure, the UE 115-b may not have a valid security context established with the network. Accordingly, base station 105-c may transmit the first set of information in an unprotected message (i.e., the first set of information lacks protection via ciphering, integrity protection, or both) so that UE 115-b may successfully receive and decode the first set of information. However, transmitting the first set of information in the unprotected message leaves the information vulnerable for attack by a fake base station 105-d. In some cases, if a fake base station 105-d relays the first set of information from the base station 105-c to the UE 115-b, the fake base station 105-d may modify the information in one or more ways. As such, UE 115-b may receive inauthentic information (e.g., inauthentic system information) from base station 105-c due to the man-in-the-middle attack by base station 105-d. This attack may result in performance loss or other inefficiencies at UE 115-b.

At 315, UE 115-b may perform a connection procedure 315 to connect to the network. The connection procedure may include a random access procedure and an RRC configuration procedure. In some cases, UE 115-b may perform the connection procedure to attach to the network via base station 105-c. However, in other cases (e.g., if the fake base station 105-c relays information between base station 105-c and UE 115-b), UE 115-b may perform the connection procedure to attach to the network via fake base station 105-d (e.g., and base station 105-c). The connection procedure 315 may involve UE 115-b transmitting a RACH request message (Msg1) and receiving a RACH response (RAR) message (Msg2) from base station 105-c. Additionally, the connection procedure 315 may involve UE 115-b transmitting an RRC connection request message (Msg3) to base station 105-c, receiving an RRC connection setup message (Msg4) from base station 105-c, and transmitting an RRC connection setup complete message (Msg5) to base station 105-c upon configuring the RRC. In some cases, one or more of these messages may be referred to as initial AS messages. For example, UE 115-b may transmit the RRC connection setup complete message as an initial AS message.

At 320, UE 115-b may transmit a registration request to the network. Registering the UE 115-b with the network may allow the UE 115-b to obtain a valid NAS security context with the network. The registration request may be sent to the network via fake base station 105-d, base station 105-c, network entity 305, or any combination of these devices. At 325, the network may perform an authentication procedure to authenticate UE 115-b. In some cases, the UE 115-b may additional authenticate the base stations 105, the network, or both.

At 330, the network may send a NAS security mode command (e.g., by a network entity 305) to UE 115-b. For example, base station 105-c may receive the NAS security mode command from the network entity 305 and may forward the NAS security mode command to UE 115-b. The network may include network policy information in the NAS security mode command. For example, the UE 115-b may receive, at 330, an indication that a security feature (e.g., security protection for the first set of information) is enabled. This indication may be an indication of SIB and/or MIB protection at the radio access network (RAN). In one example, the NAS security mode command may include an information element (e.g., one or more bits) to indicate whether the security feature is enabled. For example, a first bit value (e.g., a one (1) value) for this information element may indicate that SIB and/or MIB protection is enabled for the network, while a second bit value (e.g., a zero (0) value) may indicate that SIB and/or MIB protection is not enabled or disabled for the network. The UE 115-b may receive the NAS security mode command message, identify the value of this indication, and determine whether to perform detection of system information modification using AS SMC, as described herein, based on the identified value. UE 115-b may configure NAS securities based on the NAS security mode command and may transmit, at 335, a NAS security mode complete message in response.

At 340, base station 105-c may transmit an AS security mode command to UE 115-b. UE 115-b may configure AS securities based on the AS security mode command and may transmit, at 345, an AS security mode complete message in response. The base station 105-c may include network policy information in the AS security mode command. For example, the UE 115-b may receive, at 340, an indication that a security feature (e.g., security protection for the first set of information) is enabled. This indication may be an indication of SIB and/or MIB protection at the RAN. In some cases (e.g., if security protection for the first set of information is enabled), UE 115-b may include an indication of the first set of information in the AS security mode complete message. That is, at 345, UE 115-b may transmit, to base station 105-c, an indication of the first set of information. As the AS security mode complete message is a protected message (e.g., the information contained in the AS security mode complete message is ciphered, integrity protected, or both), the indication is protected via ciphering, integrity protection, or both.

In a first example, the indication may be an example of a hash value. This hash value may be based on the first set of information received at UE 115-*b*. In some cases, the hash value may additionally be based on an SFN value associated with the first set of information. For example, UE 115-*b* may calculate a hash value for a SIB using at least a portion of the SIB and the corresponding SFN value as inputs to a hashing function. The hashing function may be pre-configured at UE 115-*b*, configured by the network or base station 105-*c* in a protected message, or dynamically determined by UE 115-*b*. Additionally or alternatively, UE 115-*b* may determine a hash value for multiple SIBS, a MIB, or some combination thereof. UE 115-*b* may also include, in the AS security mode complete message, an indication of the MIB and/or SIB(s) (e.g., SIB number) read by UE 115-*b* at 310 and used to generate the hash. Additionally or alternatively, the indication may include other unprotected information exchanged between the UE 115-*b* and the real base station 105-*c* prior to completing the security setup procedure. Such unprotected information may also be used to generate the hash.

Base station 105-*c* may receive, from UE 115-*b*, the indication of the information received at the UE 115-*b*. At 350, base station 105-*c* may determine whether to re-transmit, to the UE 115-*b*, the first set of information in a protected message (e.g., where the first set of information is protected via ciphering, integrity protection, or a combination thereof) based on the indication of the second set of information. For example, base station 105-*c* may determine whether UE 115-*b* received the correct system information by comparing the information indicated by the hash value at 345 to the information transmitted at 310. If base station 105-*c* detects any prior modification of the first set of information (e.g., if the MIB and/or SIB(s) indicated by the hash value at 345 are different from the MIB and/or SIB(s) transmitted at 310), base station 105-*c* may determine to re-transmit the modified information. Additionally or alternatively, if base station 105-*c* identifies a change to the system information for the network since UE 115-*b* received the system information at 310, the base station 105-*c* may determine to re-transmit the changed information. In these cases, base station 105-*c* may re-transmit the first set of information (e.g., a portion or a complete MIB, set of SIBs, or some combination thereof) to UE 115-*b* at 355. For example, base station 105-*c* may re-transmit the first set of information in an RRC re-configuration message, where the first set of information is protected via ciphering, integrity protection, or a combination thereof.

In a second example, the indication may be an example of a request for information. For example, if UE 115-*b* received a particular MIB or SIB at 310, UE 115-*b* may send a request for the MIB or SIB at 345. UE 115-*b* may indicate a MIB, a set of SIBs (e.g., using SIB numbers), or both in a protected request for re-transmission. Base station 105-*c* may receive the request and may determine to re-transmit the indicated information to UE 115-*b* in a protected message. For example, if UE 115-*b* requests re-transmission of the first set of information, base station 105-*c* may re-transmit the first set of information in an RRC re-configuration message at 355, where the first set of information is protected via ciphering, integrity protection, or a combination thereof. Additionally or alternatively, base station 105-*c* may re-transmit any system information that changed for the network since UE 115-*b* received the system information at 310.

In some examples, UE 115-*b* may transmit some combination of one or more hash values and one or more requests for re-transmissions in an uplink message. Base station 105-*c* may transmit the RRC re-configuration message with or without the re-transmission of the first set of information depending on the indication received from UE 115-*b*.

At 360, UE 115-*b* may determine the authenticity of the first set of information received at 310. For example, UE 115-*b* may decode the protected information re-transmitted by base station 105-*c* at 355 and may determine if the re-transmitted information is different from the information initially received at 310. If the received sets of information are the same, UE 115-*b* may determine that the first set of information received at 310 is authentic and may communicate with the network using the established connection. In this case, the UE 115-*b* may not be receiving modified messages from a fake base station 105-*d*. The UE 115-*b* may re-configure an RRC connection based on the RRC re-configuration message and may transmit an RRC re-configuration complete message to base station 105-*c* at 365.

If the received sets of information are different, UE 115-*b* may determine that the unprotected message received at 310 was modified and is inauthentic. In these cases, UE 115-*b* may determine the presence of fake base station 105-*d* based on detecting the unauthorized message modification. If UE 115-*b* detects that it is connected to a fake base station 105-*d*, UE 115-*b* may detach from the fake base station 105-*d*. UE 115-*b* may reattach to a different base station 105 to communicate with the network. In some cases, UE 115-*b* may connect directly to base station 105-*c*. In other cases, UE 115-*b* may connect to another base station 105 (not shown) that may act as a relay for between base station 105-*c* and UE 115-*b*. In any of these cases, UE 115-*b* may repeat the above process to determine if the new connection is to a real base station 105 or a fake base station 105. Once UE 115-*b* connects to a real base station verified by the network, where the UE 115-*b* determines the connection based on receiving authentic system information in an unprotected message, UE 115-*b* may communicate with the network via the connection.

If UE 115-*b* detects one or more fake base stations 105, UE 115-*b* may report the fake base stations 105 upon successfully connecting to the network via a verified base station 105. For example, a registered UE 115-*b* (e.g., a UE 115 having a valid NAS security context) may report, to a verified base station 105-*c*, an identity of a detected or suspected fake base station 105-*d*, at least a portion of the inauthentic information (e.g., MIB or SIB contents modified by the fake base station 105-*d*) for the detected or suspected fake base station 105-*d*, or a combination of these. Base station 105-*c* may receive the report and perform a verification process with an identified fake base station 105-*d*. This verification process may allow the network to attempt to verify the legitimacy of a detected or suspected fake base station 105-*d*. The verification process may involve base station 105-*c* performing transport network layer (TNL) discovery to attempt to receive an address for fake base station 105-*d*, setting up an Xn connection with fake base station 105-*d*, reporting the fake base station 105-*d* to a network entity 305, or performing some combination of these or related processes. If base station 105-*c* or the network verifies that base station 105-*d* is a fake base station, base station 105-*c* may generate and transmit a message identifying the fake base station 105-*d* as a security threat. In some cases, this fake base station 105-d identification may be included in a MIB or SIB transmission. UEs 115 receiving the message may refrain from connecting to the fake base station 105-d based on this message.

In some cases, once a UE 115 has completed initial network access and is registered with the network, the network may provision the UE 115 with a UE-specific key. The UE-specific key may improve protection for initial AS messages by the registered UE 115-b, reducing the latency involved in detecting fake base stations 105 during a connection procedure. For example, at 370, the network (by a network entity 305) may forward the UE-specific key to UE 115-b via base station 105-c. This UE-specific key may be transmitted in a registration accept message at 370, which may be in response to the registration request message received by the network at 320. A registered UE 115-b may use the UE-specific key to protect an indication of information transmitted in an initial AS message (e.g., a RACH request, an RRC connection request, an RRC connection setup complete message, etc.) in a subsequent connection procedure.

To create the UE-specific key, the network entity 305 may use a master key. The network entity 305 (e.g., an AMF) may generate and/or store a master initial AS key, $K_{INIT\_AS}$. The network entity 305 may provision this master key, a key index corresponding to a specific version (e.g., a current version) of the master key, one or more algorithms (e.g., encryption algorithms, such as initial AS security protection algorithms), or some combination of these variables to verified base stations 105 of the network. For example, the network entity 305 may provision some or all of this information to base stations 105 in an area (e.g., a tracking area, a registration area, etc.) associated with the network entity 305.

The network entity 305 may derive the UE-specific key using the master key and the identity of the UE 115-b. For example, the network entity 305 may perform a key derivation function, where the key derivation function accepts the master key and one or more identifiers of the UE 115-b as inputs and outputs a UE-specific initial AS security key, $K_{INIT\_AS\_UE}$. The UE identifiers may include a globally unique temporary identity (GUTI), a serving temporary mobile subscriber identity (S-TMSI), a temporary mobile subscriber identity (TMSI), or any combination of these or other identifiers for the UE 115-b. The UE-specific initial AS key may be associated with a specific key index (e.g., based on the key index of the master key used to derive the UE-specific key). The network entity 305 may provision UE 115-b with the UE-specific key at 370. Additionally, the network entity 305 may provision UE 115-b with the key index associated with the UE-specific key, one or more security algorithms for initial AS protection, or a combination thereof. This provisioning may be performed via the verified base station 105-c in a secure NAS message, such as a registration accept message.

As discussed above, alternative examples of the process flow 300 may be implemented, where some steps are performed in a different order than described or are not performed at all. For example, in some cases 320, 325, 330, and 335 may be replaced with a service request message from the UE 115-b to the base station 105-c (e.g., in such cases, 370 may be replaced by a service accept message). As another example, a message transmitted at 370 (e.g., a registration accept message or a service accept message) may be transmitted before the AS SMC (e.g., transmitted at 340). As yet another example, any other RRC messages may be communicated at 355 and 365 (e.g., and may include, in some cases, a corrected set of one or more system information).

Figure 4:
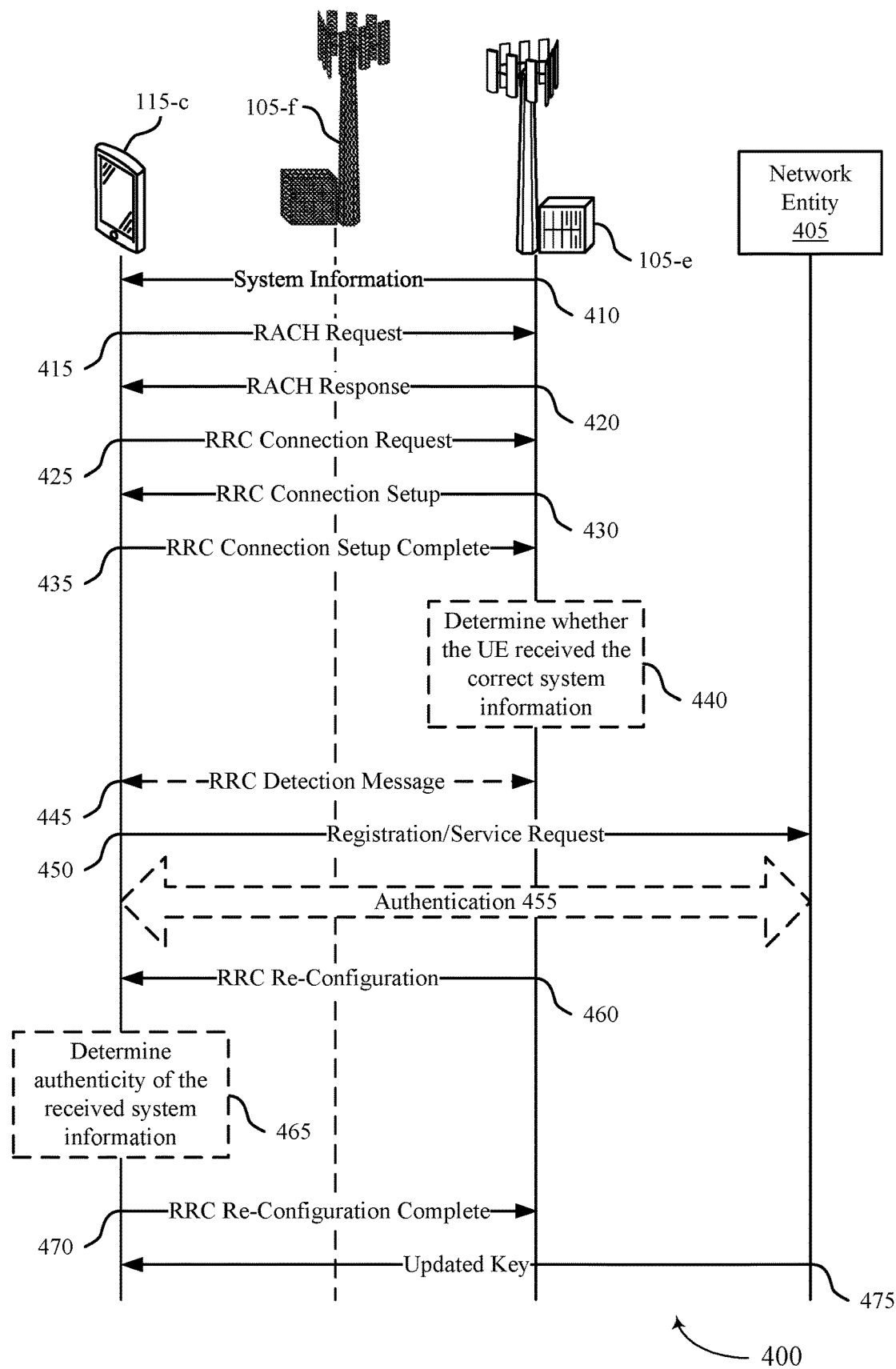
FIG. 4 illustrates an example of a process flow that supports detection of system information modification using AS SMC in accordance with aspects of the present disclosure.

FIG. 4 illustrates an example of a process flow 400 that supports detection of system information modification using AS SMC in accordance with aspects of the present disclosure. The process flow 400 may illustrate a network access procedure for a registered UE 115 (e.g., a UE 115 with a previously established, valid NAS security context). In some examples, the process flow 400 may implement aspects of wireless communications systems 100 and 200. The process flow 400 may include base station 105-e and UE 115-c, which may be examples of the devices described with reference to FIGS. 1 and 2. Base station 105-e may be an example of a real or verified base station of a network. The base station 105-e may communicate with the network via a network entity 405, such as an AMF, an SEAF, or some combination of these or other network entities. In some cases, a device may operate as a relay between base station 105-e and UE 115-c. This device may function as a fake base station 105-f. Alternative examples of the following may be implemented, where some steps are performed in a different order than described or are not performed at all. In some cases, steps may include additional features not mentioned below, or further steps may be added.

UE 115-c may be an example of a registered UE 115. For example, UE 115-c may have previously performed an initial access procedure to register with the network, as described herein with reference to FIG. 3. During this initial access procedure, the network may provision UE 115-c with a UE-specific key for protecting initial AS messages. If registered UE 115-c performs a connection procedure with a valid NAS security context and UE-specific key, the network may support UE 115-c authenticating a first set of information (e.g., system information) and detecting a connection to a fake base station 105-f. This connection procedure by UE 115-c may be an example of a handover procedure, a re-connection procedure based on UE 115-c entering an RRC connected mode from an RRC idle mode, or any other connection procedure where UE 115-c attempts to connect to the network via a different base station 105.

At 410, UE 115-c may receive, from base station 105-e, a first set of information associated with communicating with the network. For example, the first set of information may include system information in a MIB, a set of SIBs, or a combination thereof. Base station 105-c may transmit the first set of information in an unprotected message (i.e., the first set of information lacks protection via ciphering, integrity protection, or both), and UE 115-c may successfully receive and decode the first set of information. However, because the first set of information is not protected by ciphering, integrity protection, or both, a fake base station 105-f may receive (e.g., intercept) the first set of information, decode the information, and modify the information. Modifying the information, such as system information, may allow the fake base station 105-f to reduce the efficiency or performance of communications between the UE 115-c and the network. As such, UE 115-c may receive inauthentic information (e.g., system information modified by a fake base station 105-f) from base station 105-e due to the message modifications made during relaying of the information through fake base station 105-f.

UE 115-b may perform a connection procedure based on the received first set of information. This connection procedure may involve a RACH procedure, an RRC configuration procedure, or both as described with respect to the connection procedure 315 of FIG. 3. The connection procedure may include 415, 420, 425, 430, and 435 as described herein.

At 415, UE 115-c may transmit a RACH request to a base station 105 in order to connect to the base station 105. This base station 105 may be an example of a fake base station 105-f or a verified base station 105-e. At 420, UE 115-c may receive a RACH response from the base station 105 in response to the RACH request. At 425, UE 115-c may transmit an RRC connection request to the base station 105, and may receive an RRC connection setup message in response at 430. UE 115-c may update an RRC connection based on the received RRC connection setup message and, at 435, may transmit an RRC connection setup complete message in response.

To support information protection and fake base station 105 detection, UE 115-c may transmit a secure indication of the first set of information received by UE 115-c at 410 during the connection procedure. This indication may be an example of a hash value or a request for re-transmission as described with reference to FIG. 3. UE 115-c may transmit the indication to a base station 105 as a component of the RACH request, the RRC connection request, or the RRC connection setup complete message. Although these messages may be examples of unprotected messages (e.g., the messages transmitted by UE 115-c at 415, 425, and 435 may lack protection via ciphering, integrity protection, or both), UE 115-c may partially protect a message using the UE-specific key provisioned to UE 115-c. For example, UE 115-c may perform partial ciphering on an initial AS message to protect at least the indication of the first set of information. UE 115-c may additionally perform integrity protection on the entire message for improved protection.

To perform this partial protection, UE 115-c may derive one or more initial AS security protection keys from the UE-specific key received from the network entity 405 (e.g., previously in a registration accept message). UE 115-c may derive an initial AS encryption key, $K_{INIT\_AS\_Enc}$, an initial AS integrity protection key, $K_{INIT\_AS\_Int}$, or both based on a provisioned UE-specific initial AS key, $K_{INIT\_AS\_UE}$. In some cases, the initial AS security protection key(s) may be derived from an intermediate key, rather than directly from the UE-specific key. For example, UE 115-c may derive a temporary initial AS key, $K_{temp\_INIT\_AS}$, based on the UE-specific key and a freshness parameter. UE 115-c may implement a key derivation function (KDF), such that:

$$K_{temp\_INIT\_AS} = \text{KDF}(K_{INIT\_AS\_UE}, \text{freshness parameter}), \quad (1)$$

where the freshness parameter may be the SFN value for the information indicated by the secure indication, a pseudo-random number (e.g., generated by a random number generator at UE 115-c), or a combination thereof. UE 115-c may provide freshness parameter to the base station 105 along with the secure indication. However, the freshness parameter may be unprotected, such that a verified base station 105-e may receive the freshness parameter and may determine the temporary key using the freshness parameter. Additionally or alternatively, UE 115-c may determine one or more initial AS security protection keys based on an algorithm type and/or algorithm identifier. For example:

$$K_{INIT\_AS\_Enc,Int} = \text{KDF}(K_{INIT\_AS\_UE}, \text{algorithm type}, \text{algorithm ID}) \quad (2)$$

The algorithm type, algorithm identifier, or both may be pre-configured at UE 115-c, previously provisioned by the network, or dynamically selected by the UE 115-c and included (unprotected) along with the secure indication in the transmission. UE 115-c may use the derived keys to protect the indication of the first set of information in the initial AS transmission (e.g., using a $K_{INIT\_AS\_Enc}$ for ciphering the information, a $K_{INIT\_AS\_Int}$ for integrity protecting the information, or both).

A network-verified base station 105-e may receive the initial AS message (e.g., the RACH request, RRC connection request, or RRC connection setup complete message) and may derive the one or more initial AS security protection keys needed to determine the indication of the first set of information. For example, the network entity 405 may provision the verified base station 105-e with a master initial AS key, $K_{INIT\_AS}$. Base station 105-e may derive the UE-specific initial AS key, $K_{INIT\_AS\_UE}$, from the master key, $K_{INIT\_AS}$, and the identity of the UE 115-c (e.g., one or more UE identifiers, such as a GUTI, S-TMSI, TMSI, etc.). Using the derived UE-specific key, the base station 105-e may derive the one or more initial AS security protection keys (in some cases based on an intermediate key, such as the $K_{temp\_INIT\_AS}$) using the parameters received from UE 115-c and the same KDF(s). Once base station 105-e derives the keys used to protect the indication, base station 105-e may determine the protected indication using the one or more initial AS security protection keys (e.g., using the $K_{INIT\_AS\_Enc}$ to decipher the information, the $K_{INIT\_AS\_Int}$ to reverse integrity protection for the information, or both). As the network does not provision the master key and/or key index to fake base stations 105, a fake base station 105-f receiving the initial AS message may not be able to derive the keys used to protect the indication of the first set of information. As such, a fake base station 105-f may not be able to modify the indication of the first set of information. Accordingly, verified base station 105-e may correctly receive the indication of the first set of information received by UE 115-c at 410.

At 440, in some cases, base station 105-e may determine whether the UE 115-c received the correct first set of information (e.g., system information) at 410. For example, if base station 105-e decrypts the indication received in the initial AS message, where the indication is a hash value of the information received by UE 115-c at 410, base station 105-e may compare the information transmitted to UE 115-c at 410 to the information received by UE 115-c at 410. If these sets of information do not match, base station 105-e may determine that the information received at UE 115-c was modified, for example, by a fake base station 105-f. In these cases, base station 105-e may re-transmit the first set of information to UE 115-c in a protected message (e.g., where the re-transmitted information is protected via ciphering, integrity protection, or both). Additionally or alternatively, base station 105-e may identify a request for re-transmission in the decrypted indication and may re-transmit the first set of information to UE 115-c in a protected message based on this request. Further, if base station 105-e determines that system information for the network has changed since UE 115-c received the system information at 410, base station 105-e may re-transmit the system information (e.g., now the updated system information) to UE 115-c.

In a first example, base station 105-e may re-transmit the information in an RRC re-configuration message. UE 115-c may transmit a registration and/or service request at 450, the network may perform authentication at 455, and base station 105-e may transmit the RRC re-configuration message, including the first set of information, at 460. In this example, at 465, UE 115-c may determine an authenticity of the information initially received by UE 115-c at 410 based on the re-transmitted information. For example, if the two sets of information are different, UE 115-c may determine that the information received at 410 is inauthentic and may determine to detach from the connected base station 105 (e.g., fake base station 105-f). If the two sets of information match (or if UE 115-c did not receive a re-transmission of information in the RRC re-configuration message), UE 115-c may continue the network access procedure. For example, UE 115-c may re-configure the RRC configuration and transmit an RRC re-configuration complete message at 470. UE 115-c may then communicate with the network using the connected base station 105 (e.g., verified base station 105-e).

In a second example, base station 105-e and UE 115-c may use an RRC message to indicate detection of a base station 105 during connection setup. In some cases, base station 105-e may transmit the RRC detection message at 445 to UE 115-c. In these cases, the RRC message may include the re-transmission of information for UE 115-c and UE 115-c may determine the authenticity of received system information based on the re-transmitted information. Alternatively, UE 115-c may transmit an RRC message (e.g., an RRC detection message) as an initial step of a connection procedure (e.g., prior to a RACH procedure, prior to an RRC connection procedure, and/or prior to a registration or service procedure). A registered UE 115-c may be configured to transmit this RRC message at the start of any connection procedure. The RRC message may be protected using one or more initial AS keys. The UE 115-c may monitor for an expected response from the base station 105. If UE 115-c does not receive the expected response, UE 115-c may identify an abnormal call flow and may indirectly determine that the base station 105 is a fake base station 105. In these cases, UE 115-c may not perform the connection procedure with the identified fake base station 105 and instead may continue searching for a different base station 105 to connect to. For example, if a fake base station 105-f receives the protected RRC message, the fake base station 105-f may not be able to determine the protected information, as the fake base station 105-f is not provisioned with information needed to determine the one or more initial AS keys. As such, the fake base station 105-f may not determine how to respond to the RRC message. However, if a verified base station 105-e receives the protected RRC message, the verified base station 105-e may be provisioned with information to determine the one or more initial AS keys. As such, the verified base station 105-e may determine the protected information and may respond accordingly, implicitly indicating to the UE 115-c that the UE 115-c is initiating a connection procedure with a verified base station 105 (and not a fake base station).

In some cases, once UE 115-c has network access (e.g., via a verified base station 105-e), the network may provision an updated UE-specific key to UE 115-c at 475. For example, the network entity 405 may update a master key to a new version and may derive an updated UE-specific key using this updated master key. The base station 105-e may forward the updated UE-specific key, the updated key index, or both from the network entity 405 to the UE 115-c. The UE 115-c may remove the previous UE-specific key from memory and replace it with the updated UE-specific key. Additionally, the network entity 405 may provision the base station 105-e with the updated master key, the updated key index, or both (e.g., when provisioning the UE 115-c or when base station 105-e receives a message protected using a UE-specific key). The updated UE-specific key may be sent to UE 115-c in a secure NAS message, such as a registration and/or service accept message.

As discussed above, alternative examples of the process flow 400 may be implemented, where some steps are performed in a different order than described or are not performed at all. For example, in some cases a message transmitted at 475 may include a registration accept message or a service accept message. As another example, another type of RRC message may be communicated at 460 and/or 470.

Figure 5:
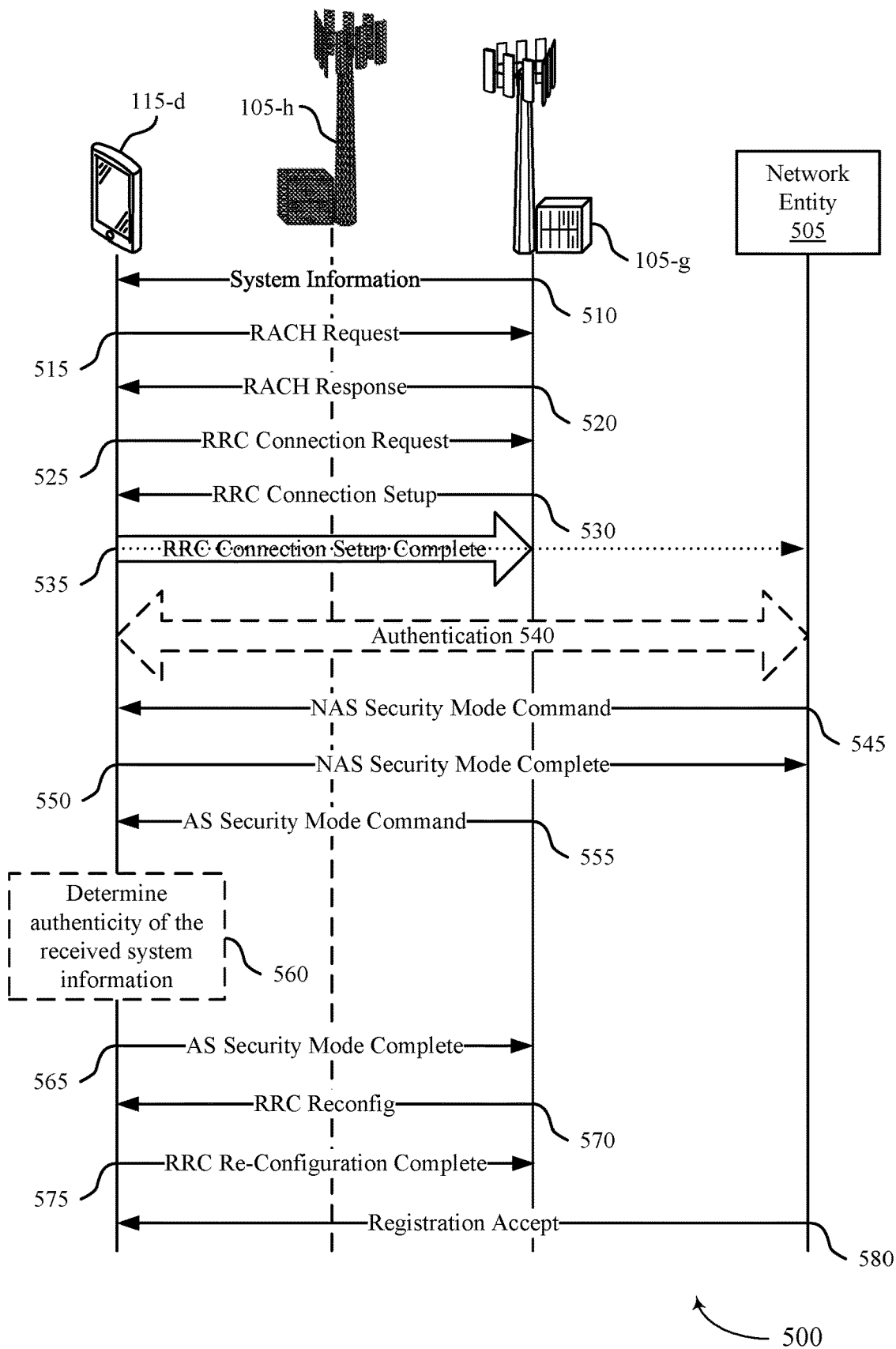
FIG. 5 illustrates an example of a process flow that supports detection of system information modification using AS SMC in accordance with aspects of the present disclosure.

FIG. 5 illustrates an example of a process flow 500 that supports detection of system information modification using AS SMC in accordance with aspects of the present disclosure. The process flow 500 may illustrate a network access procedure for a registered UE 115 (e.g., a UE 115 with a previously established, valid NAS security context). In some examples, the process flow 500 may implement aspects of wireless communications systems 100 and 200. The process flow 500 may include base station 105-g and UE 115-d, which may be examples of the devices described with reference to FIGS. 1 and 2. Base station 105-g may be an example of a real or verified base station of a network. The base station 105-g may communicate with the network via a network entity 505, such as an AMF, an SEAF, or some combination of these or other network entities. In some cases, a device may operate as a relay between base station 105-g and UE 115-d. This device may function as a fake base station 105-h. Alternative examples of the following may be implemented, where some steps are performed in a different order than described or are not performed at all. In some cases, steps may include additional features not mentioned below, or further steps may be added.

At 510, UE 115-d may receive, from base station 105-g, a first set of information associated with communicating with the network. For example, the first set of information may include system information in a MIB, a set of SIBs, or a combination thereof. Base station 105-g may transmit the first set of information in an unprotected message (e.g., the first set of information may lack protection via ciphering, integrity protection, or both), and UE 115-d may successfully receive and decode the first set of information. However, because the first set of information is not protected by ciphering, integrity protection, or both, a fake base station 105-h may receive (e.g., intercept) the first set of information, decode the information, and modify the information. Modifying the information, such as system information, may allow the fake base station 105-h to reduce the efficiency or performance of communications between the UE 115-d and the network. As such, UE 115-d may receive inauthentic information (e.g., system information modified by a fake base station 105-h) from base station 105-g due to the message modifications made during relaying of the information through fake base station 105-h.

UE 115-d may perform a connection procedure based on the received first set of information. This connection procedure may involve a RACH procedure, an RRC configuration procedure, or both as described with respect to the connection procedure 315 of FIG. 3. The connection procedure may include 515, 520, 525, 530, and 535 as described herein.

At 515, UE 115-d may transmit a RACH request to a base station 105 in order to connect to the base station 105. This base station 105 may be an example of a fake base station 105-h or a verified base station 105-g. At 520, UE 115-d may receive a RACH response from the base station 105 in response to the RACH request. At 525, UE 115-d may transmit an RRC connection request to the base station 105, and may receive an RRC connection setup message in response at 530. UE 115-*d* may update an RRC connection based on the received RRC connection setup message and, at 535, may transmit an RRC connection setup complete message in response.

In some cases, a registration request or service request may be carried in the RRC connection setup complete message (e.g., transmitted from UE 115-*d* to base station 105-*g* at 535), and the base station 105-*g* may forward the registration request or service request to network entity 505 (e.g., an AMF). At 540, in some examples, an authentication procedure between UE 115-*d* and the network entity 505 may be performed. For example, at 535, UE 115-*d* may transmit a registration request to the network (e.g., to base station 105-*g*, network entity 505, etc.). Registering the UE 115-*d* with the network may allow the UE 115-*d* to obtain a valid NAS security context with the network. In some cases, the registration request may be sent to the network via fake base station 105-*h*, base station 105-*g*, network entity 505, or any combination of these devices. At 540, the network may perform an authentication procedure to authenticate UE 115-*d*. In some cases, the UE 115-*d* may additionally authenticate the base station 105, the network, or both.

At 545, the network may send a NAS security mode command (e.g., by a network entity 505) to UE 115-*d*. For example, base station 105-*g* may receive the NAS security mode command from the network entity 305 and may forward the NAS security mode command to UE 115-*d*. The network may include network policy information in the NAS security mode command. For example, the UE 115-*d* may receive, at 545, an indication that a security feature (e.g., techniques for detection of system information modification using AS SMC discussed herein) is enabled. In some cases, this indication may be an indication of SIB and/or MIB protection at the RAN. In one example, the NAS security mode command may include an information element (e.g., one or more bits) to indicate whether the security feature is enabled. For example, a first bit value (e.g., a one (1) value) for this information element may indicate that SIB and/or MIB protection is enabled for the network, while a second bit value (e.g., a zero (0) value) may indicate that SIB and/or MIB protection is not enabled or disabled for the network. The UE 115-*d* may receive the NAS security mode command message, identify the value of this indication, and determine whether to perform detection of system information modification using AS SMC, as described herein, based on the identified value. UE 115-*d* may configure NAS securities based on the NAS security mode command and may transmit, at 550, a NAS security mode complete message in response.

According to the described techniques, the integrity of system information (e.g., MIB, SIB(s), etc.) received by the UE 115-*d* may be checked during AS security procedures. At 555, base station 105-*g* may transmit an AS security mode command (AS SMC) to UE 115-*d*. Using the AS SMC, base station 105-*g* may send a set of hash values corresponding to valid system information (e.g., of system information transmitted at 510) to UE 115-*d*. The set of hash values may include a hash value corresponding to a single set of information (e.g., a single SIB), multiple hash values each corresponding to a different set of information (e.g., different SIBs), one or more hash values corresponding to a multiple sets of information (e.g., a MIB and SIB1/2, multiple SIBs, etc.), or some combination thereof. In some cases, the base station 105-*g* may include network policy information in the AS SMC. For example, the UE 115-*d* may receive, at 555, an indication that a security feature (e.g., security protection for the first set of information) is enabled. This indication may be an indication of SIB and/or MIB protection at the RAN.

UE 115-*d* may thus receive the AS SMC and, at 560, determine an authenticity of the received system information. For example, UE 115-*d* may check the integrity of MIB/SIB(s) that the UE 115-*d* has read, from system information at 510, to access the network (e.g., when the UE 115-*d* establishes AS security with the base station 105-*g*, such as during the AS SMC procedure). At 560, UE 115-*d* may determine a hash value for system information that has been read by the UE 115-*d*, and may determine an authenticity of some read system information by comparing the determined hash value and the first hash value of the set of hash values received from the base station 105-*g* in the AS SMC (e.g., received at 555). In some cases, the UE 115-*d* may determine an authenticity of read system information by comparing determined hash values of different read system information (e.g., of two different read SIBs) with respective corresponding hash values of the set of hash values received from the base station 105-*g*.

For example, SIB1 may include hash values of individual SIBs. UE 115-*d* may read the SIB1 and identify one or more hash values of individual SIBs. In some cases, UE 115-*d* may only read certain SIBs (e.g., UE 115-*d* may only monitor for and receive SIBs corresponding to certain desired information). According to the techniques described herein, AS SMC (e.g., at 555) may include the hash of the SIB1 (e.g., the set of hash values calculated by the base station). For example, the base station may calculate a hash individually for one or more SIBs (e.g., for system information at 510) and may create a hash based on the calculated hash values for the one or more SIBs.

For example, the hash of a SIB2 that the UE 115-*d* has read in the SIB1 may be calculated as: Hash_sib2=Hash (SIB2, freshness parameter) where the freshness parameter is a pseudo-random number, global positioning system (GPS) values, a coordinated universal time (UTC) time, SFN value for the SIB, etc. In general, hash_sib_x=Hash (SIBx, freshness parameter). As the SIB1 may include the hash of all SIBs: SIB1={system information, hash_sib1, . . . , hash_sib9}. As such, the base station 105-*g* may send hash_all_sibs=Hash(hash_sib1, . . . , hash_sib9) to the UE 115-*d* in AS SMC (e.g., at 555). That is, the base station 105-*g* may compute hash_all_sibs (e.g., a set of hash values) and may, in some cases, indicate the set of hash values as a single hash to the UE 115-*d*. The UE 115-*d* may then, using its knowledge of the hash values of SIB1 through SIB9, run the single hash to check whether there is a mismatch.

At 560, UE 115-*d* may verify SIBs that it has read (e.g., SIBs that UE 115-*d* is interested in, including SIB1) by verifying that SIB1—that includes the hash of all SIBs and that hash of each SIB that it has read in the SIB1. In some cases, UE 115-*d* may not check all the hashes of the individual SIBs in the SIB1 (e.g., in some cases UE 115-*d* may not check hashes of SIBs not read by the UE 115-*d*). In some cases, a freshness parameter or random number may be included in the hash calculation (e.g., and the parameter may be signaled to the UE 115-*d*).

If system information modification (e.g., MIB/SIB change) is detected by the UE 115-*d* (e.g., by comparing the hash information received in the AS SMC and locally computed hash), the UE 115-*d* may indicate the hash mismatch in an AS security mode complete message at 565. In addition to the indication of mismatch, the UE 115-*d* also include the index of the system information that UE 115-*d* wants to acquire (e.g., MIB and SIB1 (and additionally SIB2 in LTE) may be mandatory to read, while other SIBs may be optional to read). In cases where the UE 115-*d* indicates such a hash mismatch, the base station 105-*g* may then send valid system information (e.g., corrected MIB/SIBs) in a subsequent RRC reconfiguration message (e.g., such as at 570, and the RRC reconfiguration message be both ciphered and integrity protected). If UE 115-*d* included the index of the system information, the base station may send the requested system information to UE 115-*d*. In some cases, UE 115-*d* may configure AS securities based on the AS SMC and may transmit, at 565, an AS security mode complete message in response. In some examples, as the AS security mode complete message may be a protected message (e.g., the information contained in the AS security mode complete message may be ciphered, integrity protected, or both), the indication may be protected via ciphering, integrity protection, or both.

At 570, base station 105-*g* may transmit an RRC reconfiguration message to UE 115-*d*. In this example, at 560, UE 115-*d* may determine an authenticity of the information initially received by UE 115-*d* at 510 based on the re-transmitted information. For example, if the two sets of information are different, UE 115-*d* may determine that the information received at 510 is inauthentic and may determine to detach from the connected base station 105 (e.g., fake base station 105-*h*). If the two sets of information match (or if UE 115-*d* did not receive a re-transmission of information in the RRC re-configuration message), UE 115-*d* may continue the network access procedure. For example, UE 115-*d* may re-configure the RRC configuration and transmit an RRC re-configuration complete message at 575. UE 115-*d* may then communicate with the network using the connected base station 105 (e.g., verified base station 105-*g*). Generally, any RRC messages may be communicated at 570 and 575.

At 580, in some cases, once UE 115-*d* has network access (e.g., via a verified base station 105-*g*), the network may provision a UE-specific key to UE 115-*d*. For example, in some cases, the network entity 505 may update a master key to a new version and may derive an updated UE-specific key using this updated master key. The base station 105-*g* may forward the updated UE-specific key, the updated key index, or both from the network entity 505 to the UE 115-*d*. The UE 115-*d* may remove the previous UE-specific key from memory and replace it with the updated UE-specific key. Additionally, the network entity 505 may provision the base station 105-*g* with the updated master key, the updated key index, or both (e.g., when provisioning the UE 115-*d* or when base station 105-*g* receives a message protected using a UE-specific key). In some cases, the updated UE-specific key may be sent to UE 115-*d* in a secure NAS message, such as a registration and/or service accept message.

As discussed above, other examples of the process flow 500 may be implemented, where some steps are performed in a different order than described or are not performed at all. For example, in some cases 535, 540, 545, and 550 may be replaced with a service request message from the UE 115-*d* to the base station 105-*g* (e.g., in such cases, 580 may be replaced by a service accept message). As another example, a message transmitted at 580 (e.g., a registration accept message or a service accept message) may be transmitted before the AS SMC (e.g., transmitted at 555). As yet another example, any other RRC messages may be communicated at 570 and 575 (e.g., and may include, in some cases, corrected set of system information).

Figure 6:
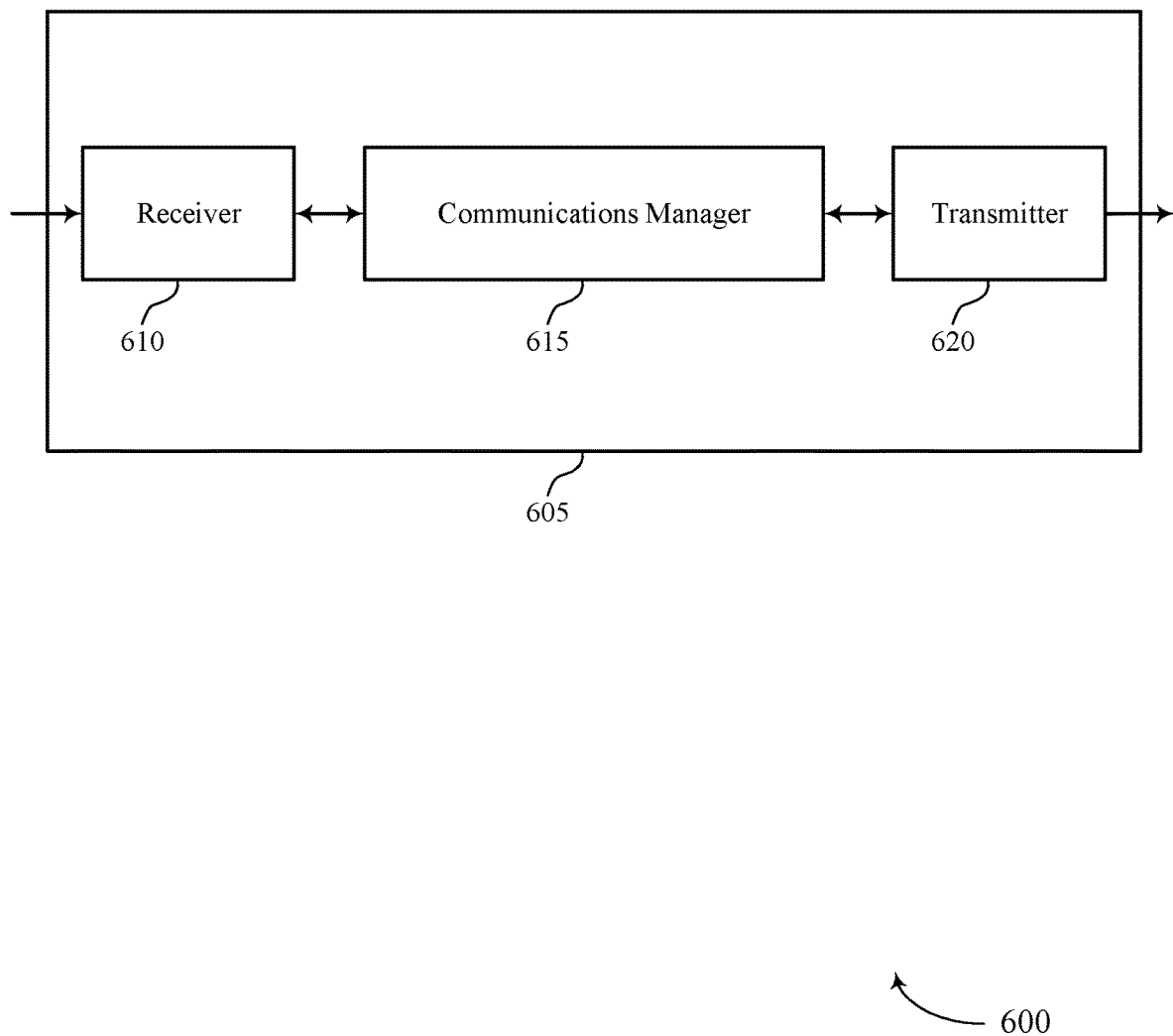
FIGS. 6 and 7 show block diagrams of devices that support detection of system information modification using AS SMC in accordance with aspects of the present disclosure.

FIG. 6 shows a block diagram 600 of a device 605 that supports detection of system information modification using AS SMC in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to detection of system information modification using AS SMC, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a protected message including a set of hash values corresponding to one or more sets of information, determine a hash value for the received first set of information, receive a first set of information at the UE, the first set of information for the UE to use to communicate with a network, determine an authenticity of the received first set of information based on a comparison of the determined hash value and a first hash value of the set of hash values received from the base station (e.g., the first hash value corresponding to the first set of information), and transmit, to the base station, an indication of the determined authenticity. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
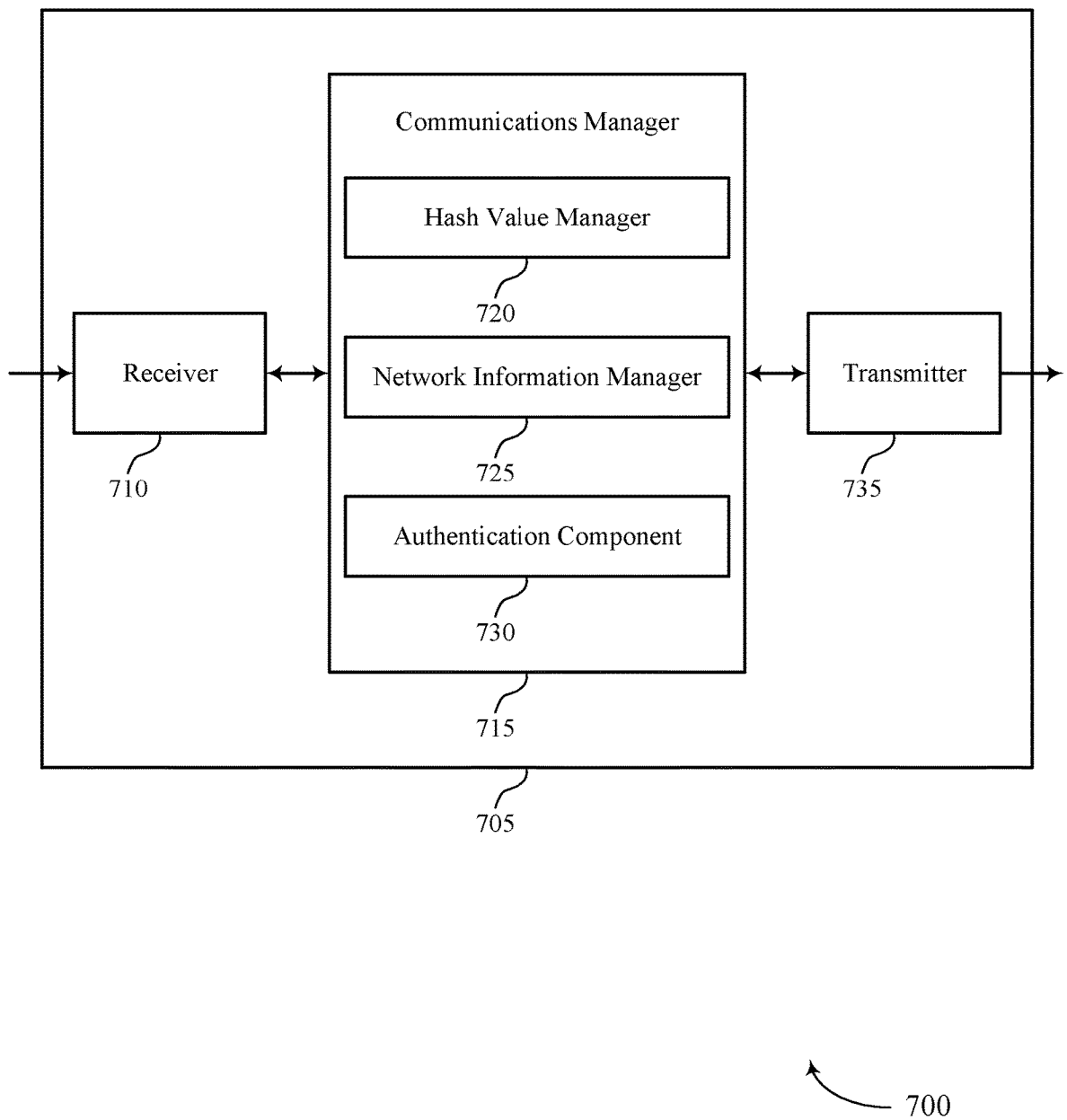

FIG. 7 shows a block diagram 700 of a device 705 that supports detection of system information modification using AS SMC in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to detection of system information modification using AS SMC, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a hash value manager 720, a network information manager 725, and an authentication component 730. The communications manager 715 may be an example of aspects of the communications manager 910 described herein.

The hash value manager 720 may receive, from a base station, a protected message including a set of hash values corresponding to one or more sets of information and determine a hash value for the received first set of information. The network information manager 725 may receive a first set of information at the UE, the first set of information for the UE to use to communicate with a network. The authentication component 730 may determine an authenticity of the received first set of information based on a comparison of the determined hash value and a first hash value of the set of hash values received from the base station (e.g., the first hash value corresponding to the first set of information) and transmit, to the base station, an indication of the determined authenticity.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
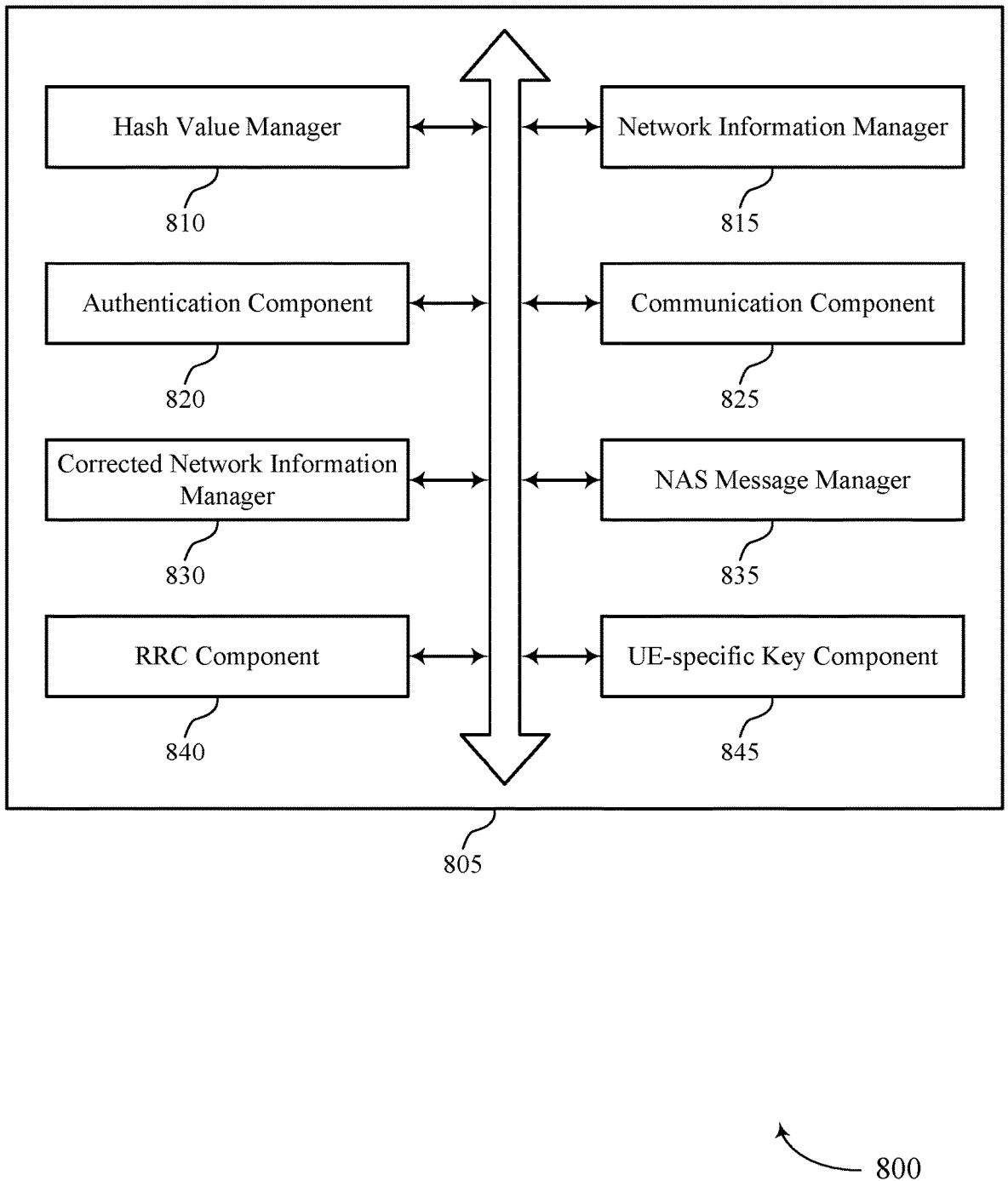
FIG. 8 shows a block diagram of a communications manager that supports detection of system information modification using AS SMC in accordance with aspects of the present disclosure.

FIG. 8 shows a block diagram 800 of a communications manager 805 that supports detection of system information modification using AS SMC in accordance with aspects of the present disclosure. The communications manager 805 may be an example of aspects of a communications manager 615, a communications manager 715, or a communications manager 910 described herein. The communications manager 805 may include a hash value manager 810, a network information manager 815, an authentication component 820, a communication component 825, a corrected network information manager 830, a NAS message manager 835, a RRC component 840, and an UE-specific key component 845. Each of these modules may communicate, directly or indirectly, with one another (e.g., via one or more buses).

The hash value manager 810 may receive, from a base station, a protected message including a set of hash values corresponding to one or more sets of information. In some examples, the hash value manager 810 may determine a hash value for the received first set of information. In some cases, the one or more sets of information include a system information block, or a master information block, or a combination thereof. The network information manager 815 may receive a first set of information at the UE, the first set of information for the UE to use to communicate with a network. In some cases, the hash value manager 810 may receive an access stratum security mode command comprising the set of hash values corresponding to the one or more sets of information.

The authentication component 820 may determine an authenticity of the received first set of information based on a comparison of the determined hash value and a first hash value of the set of hash values received from the base station. In some examples, the authentication component 820 may transmit, to the base station, an indication of the determined authenticity. In some examples, the authentication component 820 may transmit, to the base station, an indication of a matching hash value based on the comparison. In some examples, the authentication component 820 may transmit, to the base station, an indication of mismatching hash values based on the comparison. In some examples, the authentication component 820 may perform an authentication procedure with the network based on the transmitted radio resource control setup message, where the set of hash values are received based on the performed authentication procedure. In some examples, the authentication component 820 may compare the determined hash value and the first hash value of the set of hash values received from the base station based on a freshness parameter associated with the received first set of information. In some cases, the indication of mismatching hash values is transmitted in an access stratum security mode complete message.

In some examples, the authentication component 820 may identify the first hash value of the set of hash values received from the base station based at least in part on the received first set of information. In some cases, the first hash value comprises a single hash value corresponding to the received first set of information, the received first set of information comprising a single system information block. In some cases, the first hash value comprises a single hash value corresponding to the received first set of information, the received first set of information comprising at least two system information blocks. In some examples, the authentication component 820 may identify a second hash value of the set of hash values received from the base station based at least in part on the received first set of information, wherein the first hash value corresponds to a first system information block of the received first set of information and the second hash value corresponds to a second system information block of the received first set of information.

The communication component 825 may communicate with the network based on the received first set of information. In some examples, the communication component 825 may communicate with the network based on the corrected set of information. In some examples, the communication component 825 may transmit, to the base station, a radio resource control setup message including a registration request or a service request, where the protected message comprising the set of hash values is received in response at least in part to the registration request or the service request. In some examples, the communication component 825 may receive a service accept message, where the set of hash values corresponding to one or more sets of information is received based on the received service accept message. In some examples, the communication component 825 may perform a random access message exchange with the base station. In some examples, the communication component 825 may transmit a registration request or a service request to the base station following the random access message exchange, where the protected message comprising the set of hash values is received in response at least in part to the registration request or the service request. In some examples, the communication component 825 may communicate with the network based on the UE-specific key.

The corrected network information manager 830 may receive a corrected set of information in response at least in part to the transmitted indication. In some cases, the corrected set of information is protected via ciphering, integrity protection, or a combination thereof. In some cases, the corrected set of information is received in a radio resource control re-configuration message. The NAS message manager 835 may receive a non-access stratum message, where the set of hash values corresponding to one or more sets of information is received based on the received non-access stratum message. In some cases, the non-access stratum message includes a registration accept message.

The RRC component 840 may receive a first radio resource control message in response to the transmitted indication of the determined authenticity. In some examples, the RRC component 840 may transmit a second radio resource control message in response to the received first radio resource control message. The UE-specific key component 845 may receive, from the network, a registration accept message including a UE-specific key for initial access stratum security.

Figure 9:
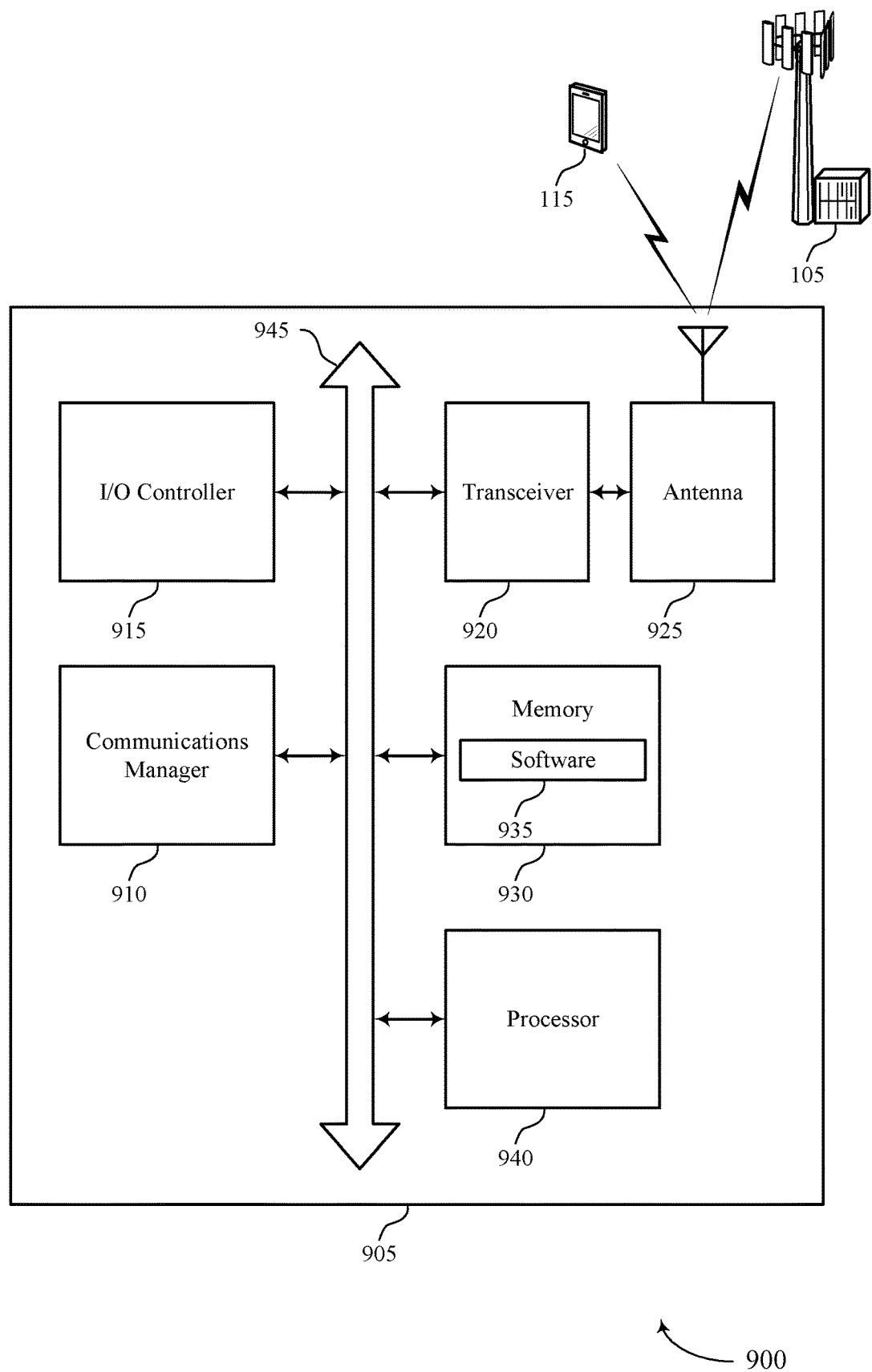
FIG. 9 shows a diagram of a system including a device that supports detection of system information modification using AS SMC in accordance with aspects of the present disclosure.

FIG. 9 shows a diagram of a system 900 including a device 905 that supports detection of system information modification using AS SMC in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a protected message including a set of hash values corresponding to one or more sets of information, determine a hash value for the received first set of information, receive a first set of information at the UE, the first set of information for the UE to use to communicate with a network, determine an authenticity of the received first set of information based on a comparison of the determined hash value and a first hash value of the set of hash values received from the base station (e.g., the first hash value corresponding to the first set of information), and transmit, to the base station, an indication of the determined authenticity.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code or software 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting detection of system information modification using AS SMC).

The software 935 may include instructions to implement aspects of the present disclosure, including instructions to support wireless communications. The software 935 may be stored in a non-transitory computer-readable medium such as system memory or other type of memory. In some cases, the software 935 may not be directly executable by the processor 940 but may cause a computer (e.g., when compiled and executed) to perform functions described herein.

Figure 10:
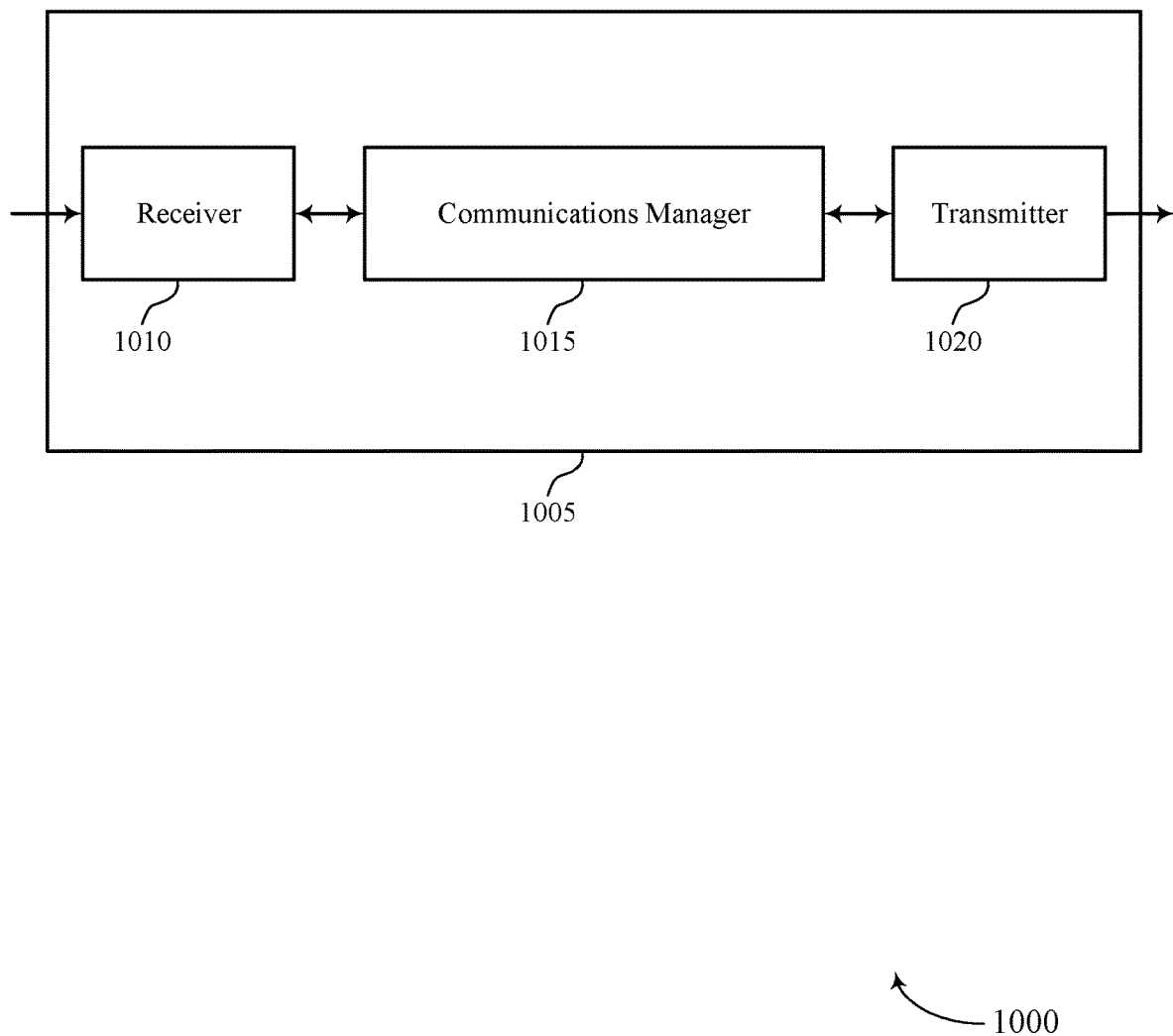
FIGS. 10 and 11 show block diagrams of devices that support detection of system information modification using AS SMC in accordance with aspects of the present disclosure.

FIG. 10 shows a block diagram 1000 of a device 1005 that supports detection of system information modification using AS SMC in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to detection of system information modification using AS SMC, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify one or more sets of information for a UE, determine a set of hash values corresponding to the one or more sets of information, transmit a protected message comprising the set of hash values to the UE, and receive, from the UE in response to the transmitted protected message comprising the set of hash values, an indication of an authenticity for a first set of information received by the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
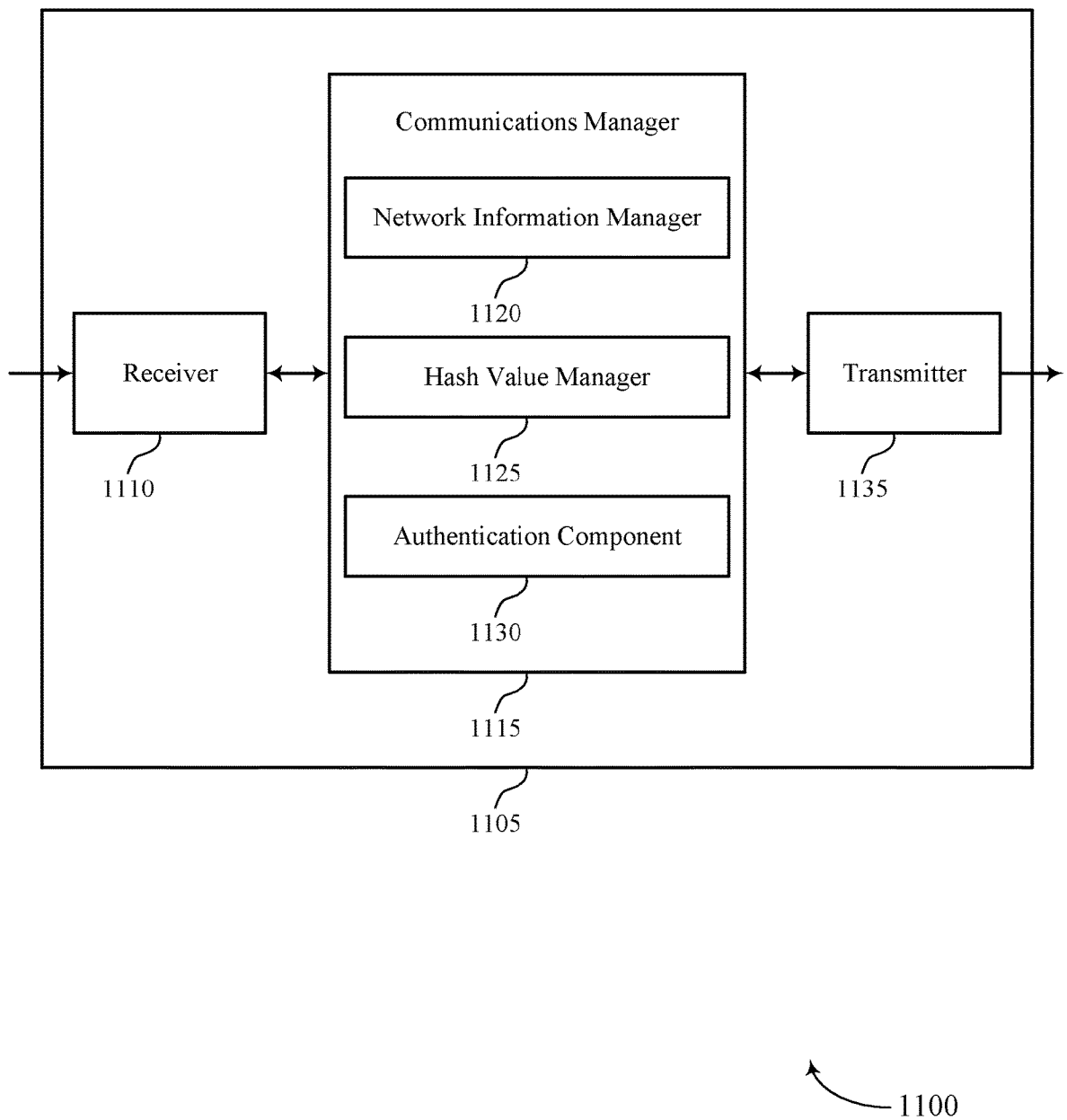

FIG. 11 shows a block diagram 1100 of a device 1105 that supports detection of system information modification using AS SMC in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to detection of system information modification using AS SMC, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a network information manager 1120, a hash value manager 1125, and an authentication component 1130. The communications manager 1115 may be an example of aspects of the communications manager 1310 described herein.

The network information manager 1120 may identify one or more sets of information for a UE. The hash value manager 1125 may determine a set of hash values corresponding to the one or more sets of information and transmit a protected message comprising the set of hash values to the UE. The authentication component 1130 may receive, from the UE in response to the transmitted protected message comprising the set of hash values, an indication of an authenticity for a first set of information received by the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
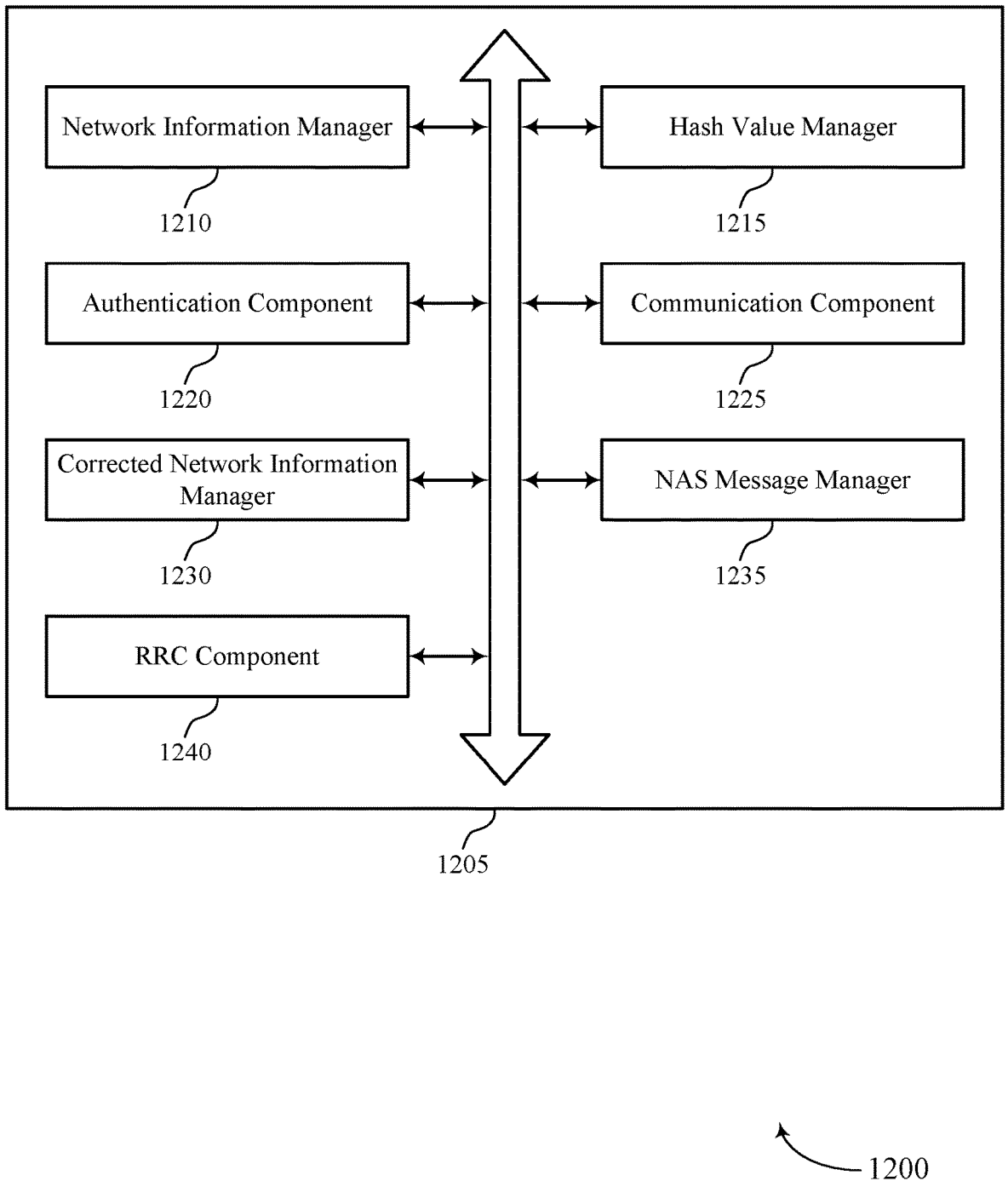
FIG. 12 shows a block diagram of a communications manager that supports detection of system information modification using AS SMC in accordance with aspects of the present disclosure.

FIG. 12 shows a block diagram 1200 of a communications manager 1205 that supports detection of system information modification using AS SMC in accordance with aspects of the present disclosure. The communications manager 1205 may be an example of aspects of a communications manager 1015, a communications manager 1115, or a communications manager 1310 described herein. The communications manager 1205 may include a network information manager 1210, a hash value manager 1215, an authentication component 1220, a communication component 1225, a corrected network information manager 1230, a NAS message manager 1235, and a RRC component 1240. Each of these modules may communicate, directly or indirectly, with one another (e.g., via one or more buses).

The network information manager 1210 may identify one or more sets of information for a UE. In some cases, the one or more sets of information include one or more system information blocks, a master information block, or a combination thereof. The hash value manager 1215 may determine a set of hash values corresponding to the one or more sets of information. In some examples, the hash value manager 1215 may transmit a protected message comprising the set of hash values to the UE. In some examples, the hash value manager 1215 may transmit an access stratum security mode command to the UE, the access stratum security mode command comprising the set of hash values corresponding to the one or more sets of information. In some cases, the network information manager 1210 may determine a first hash value of the set of hash values that corresponds to a first set of information, the first set of information comprising a first system information block. In some cases, the network information manager 1210 may determine a second hash value of the set of hash values that corresponds to a second set of information, the second set of information comprising a second system information block. In some cases, the network information manager 1210 may determine a first hash value of the set of hash values that corresponds to a first set of information, the first set of information comprising at least two system information blocks.

The authentication component 1220 may receive, from the UE in response to the transmitted protected message comprising the set of hash values, an indication of an authenticity for a first set of information received by the UE. In some examples, the authentication component 1220 may receive, from the UE, an indication of a matching hash value between the first set of information and the set of hash values. In some examples, the authentication component 1220 may receive, from the UE, an indication of mismatching hash values between the first set of information and the set of hash values. In some cases, the indication of mismatching hash values is received in an access stratum security mode complete message.

The communication component 1225 may communicate with the UE according to the first set of information. In some examples, the communication component 1225 may communicate with the UE according to the corrected set of information. In some examples, the communication component 1225 may receive, from the UE, a radio resource control setup message including a registration request or a service request, where the set of hash values are transmitted to the UE in response at least in part to the registration request or the service request. In some examples, the communication component 1225 may transmit the registration request or the service request to the network. In some examples, the communication component 1225 may receive, from the network, a UE-specific key based on the transmitted registration request or the transmitted service request. In some examples, the communication component 1225 may perform a security establishment procedure with the UE, where the set of hash values are transmitted based on the performed security establishment procedure.

In some examples, the communication component 1225 may transmit a service accept message, where the set of hash values is transmitted based on the transmitted service accept message. In some examples, the communication component 1225 may perform a random access message exchange with the UE. In some examples, the communication component 1225 may receive a registration request or a service request from the UE following the random access message exchange, where the set of hash values are transmitted in response at least in part to the registration request or the service request.

The corrected network information manager 1230 may transmit a corrected set of information based on the indication of mismatching hash values. In some cases, the corrected set of information is protected via ciphering, integrity protection, or a combination thereof. In some cases, the corrected set of information is transmitted in a radio resource control re-configuration message. The NAS message manager 1235 may transmit a non-access stratum message, where the set of hash values is transmitted based on the transmitted non-access stratum message. In some cases, the non-access stratum message includes a registration accept message.

The RRC component 1240 may transmit a first radio resource control message in response to the received indication of the authenticity. In some examples, the RRC component 1240 may receive a second radio resource control message in response to the transmitted first radio resource control message. In some examples, the RRC component 1240 may transmit a registration accept message including a UE-specific key for initial access stratum security. In some examples, the RRC component 1240 may communicate with the UE based on the UE-specific key.

Figure 13:
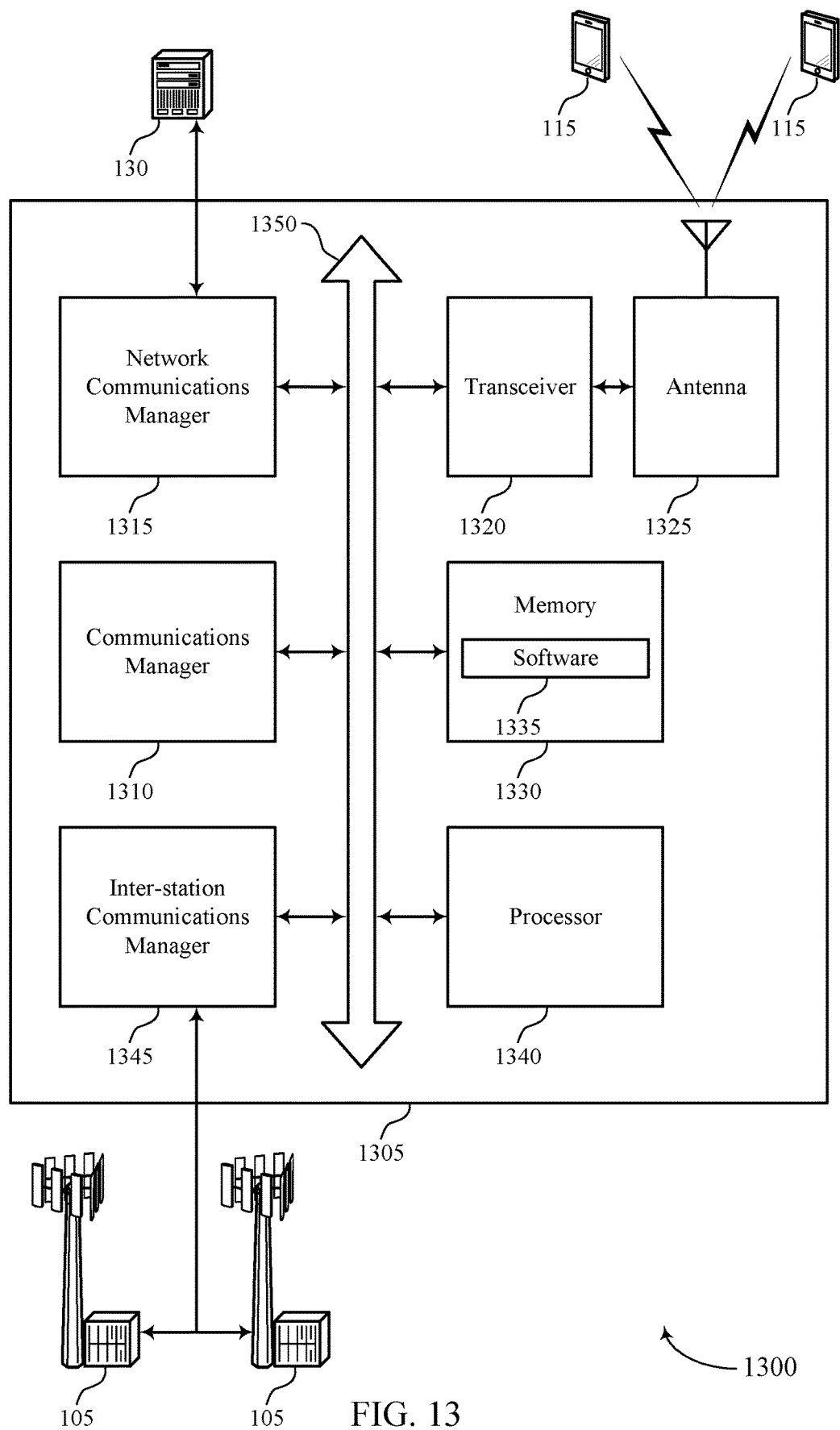
FIG. 13 shows a diagram of a system including a device that supports detection of system information modification using AS SMC in accordance with aspects of the present disclosure.

FIG. 13 shows a diagram of a system 1300 including a device 1305 that supports detection of system information modification using AS SMC in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify one or more sets of information for a UE, determine a set of hash values corresponding to the one or more sets of information, transmit a protected message comprising the set of hash values to the UE, and receive, from the UE in response to the transmitted protected message comprising the set of hash values, an indication of an authenticity for a first set of information received by the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code or software 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting detection of system information modification using AS SMC).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
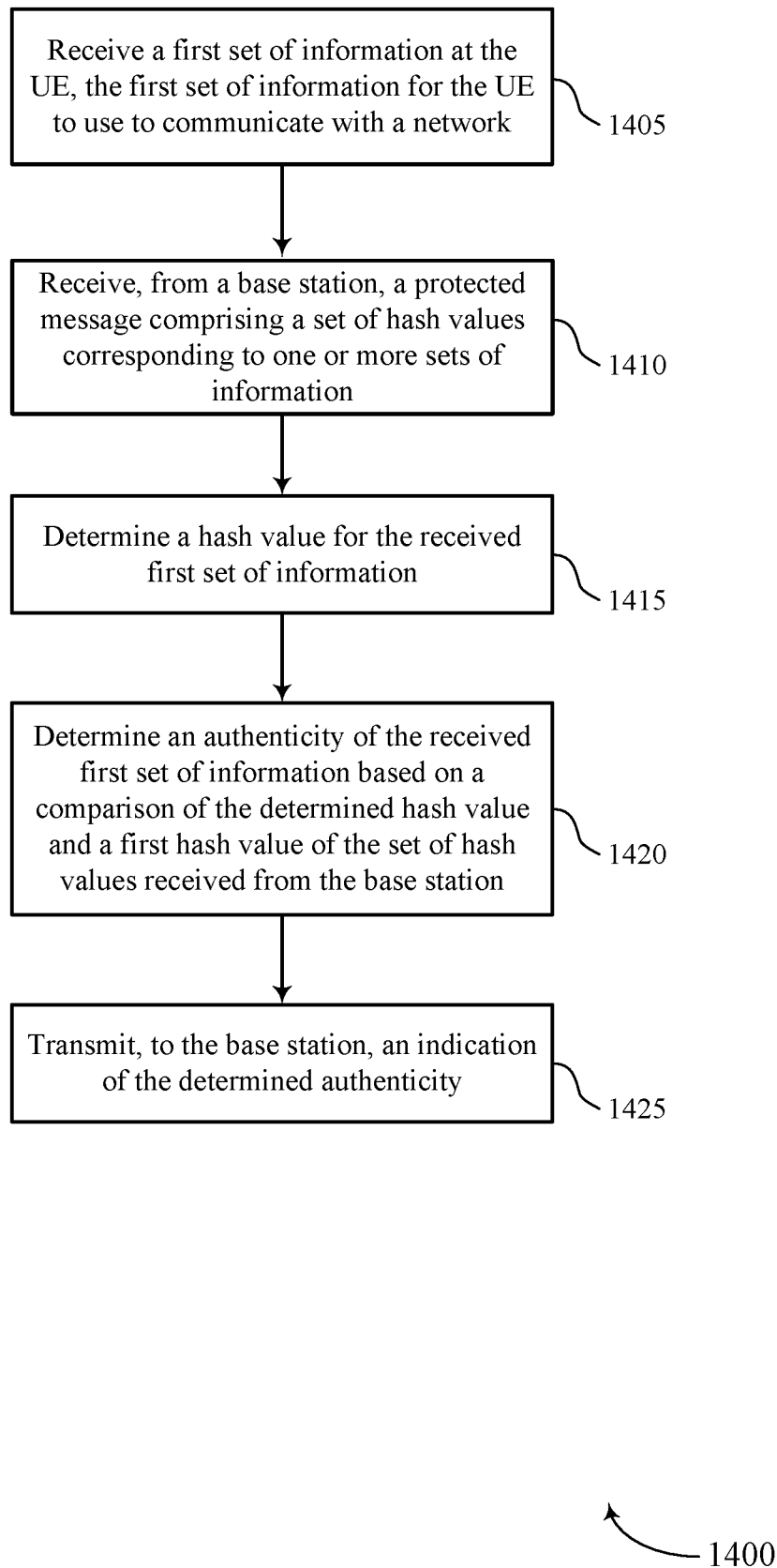
FIGS. 14 through 19 show flowcharts illustrating methods that support detection of system information modification using AS SMC in accordance with aspects of the present disclosure.

FIG. 14 shows a flowchart illustrating a method 1400 that supports detection of system information modification using AS SMC in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a first set of information at the UE, the first set of information for the UE to use to communicate with a network. The operations of 1405 may be performed according to the methods described herein. In some examples, aspects of the operations of 1405 may be performed by a network information manager as described with reference to FIGS. 6 through 9.

At 1410, the UE may receive, from a base station, a protected message including a set of hash values corresponding to one or more sets of information. The operations of 1410 may be performed according to the methods described herein. In some examples, aspects of the operations of 1410 may be performed by a hash value manager as described with reference to FIGS. 6 through 9.

At 1415, the UE may determine a hash value for the received first set of information. The operations of 1415 may be performed according to the methods described herein. In some examples, aspects of the operations of 1415 may be performed by a hash value manager as described with reference to FIGS. 6 through 9.

At 1420, the UE may determine an authenticity of the received first set of information based on a comparison of the determined hash value and a first hash value of the set of hash values received from the base station, the first hash value corresponding to the first set of information. The operations of 1420 may be performed according to the methods described herein. In some examples, aspects of the operations of 1420 may be performed by an authentication component as described with reference to FIGS. 6 through 9.

At 1425, the UE may transmit, to the base station, an indication of the determined authenticity. The operations of 1425 may be performed according to the methods described herein. In some examples, aspects of the operations of 1425 may be performed by an authentication component as described with reference to FIGS. 6 through 9.

Figure 15:
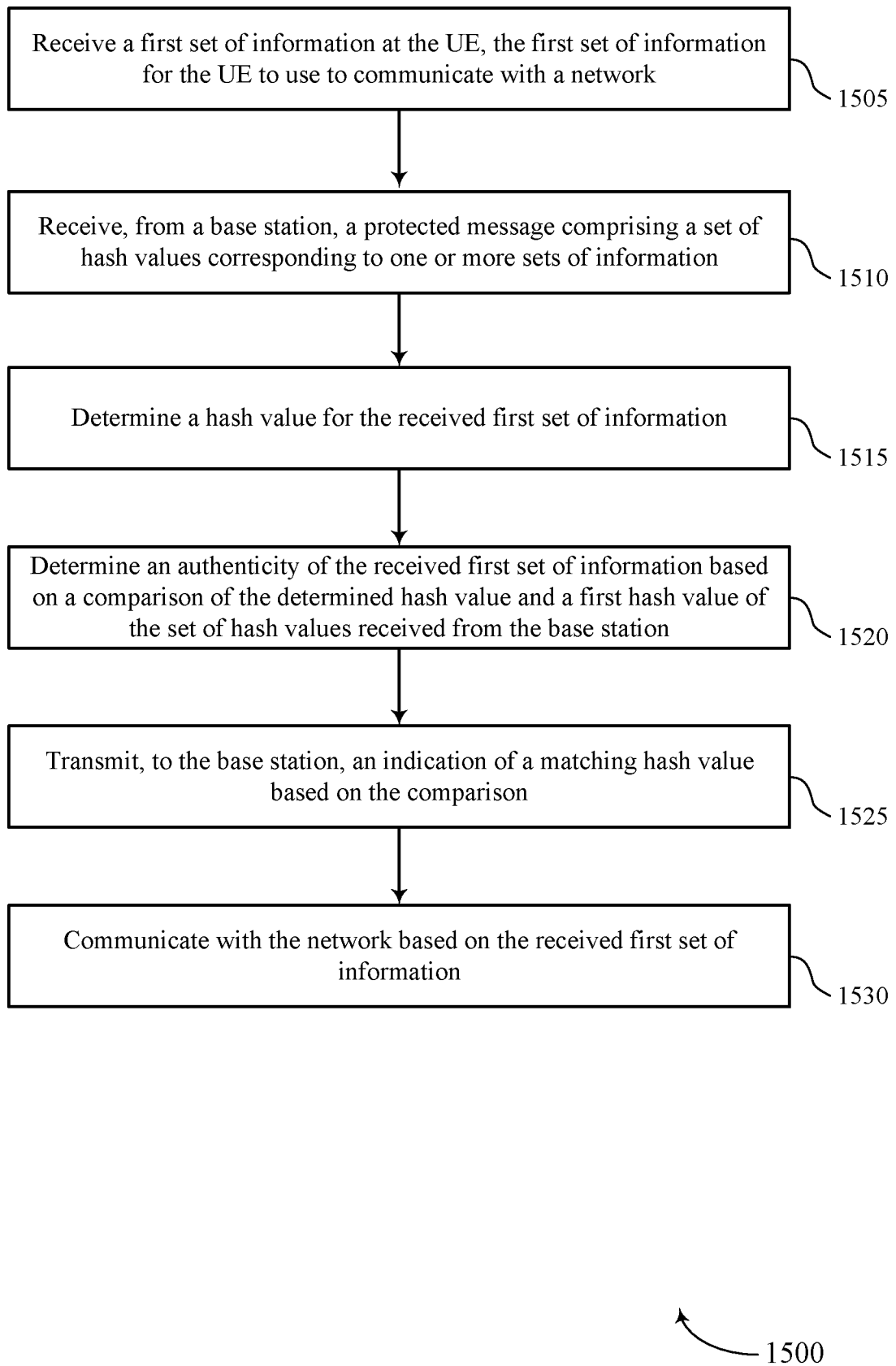

FIG. 15 shows a flowchart illustrating a method 1500 that supports detection of system information modification using AS SMC in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a first set of information at the UE, the first set of information for the UE to use to communicate with a network. The operations of 1505 may be performed according to the methods described herein. In some examples, aspects of the operations of 1505 may be performed by a network information manager as described with reference to FIGS. 6 through 9.

At 1510, the UE may receive, from a base station, a protected message including a set of hash values corresponding to one or more sets of information. The operations of 1510 may be performed according to the methods described herein. In some examples, aspects of the operations of 1510 may be performed by a hash value manager as described with reference to FIGS. 6 through 9.

At 1515, the UE may determine a hash value for the received first set of information. The operations of 1515 may be performed according to the methods described herein. In some examples, aspects of the operations of 1515 may be performed by a hash value manager as described with reference to FIGS. 6 through 9.

At 1520, the UE may determine an authenticity of the received first set of information based on a comparison of the determined hash value and a first hash value of the set of hash values received from the base station (e.g., the first hash value corresponding to the first set of information). The operations of 1520 may be performed according to the methods described herein. In some examples, aspects of the operations of 1520 may be performed by an authentication component as described with reference to FIGS. 6 through 9.

At 1525, the UE may transmit, to the base station, an indication of a matching hash value based on the comparison. The operations of 1525 may be performed according to the methods described herein. In some examples, aspects of the operations of 1525 may be performed by an authentication component as described with reference to FIGS. 6 through 9.

At 1530, the UE may communicate with the network based on (e.g., according to) the received first set of information (e.g., as the base station, and the first set of information sent by the first base station, may be authenticated based on the matching hash values). The operations of 1530 may be performed according to the methods described herein. In some examples, aspects of the operations of 1530 may be performed by a communication component as described with reference to FIGS. 6 through 9.

Figure 16:
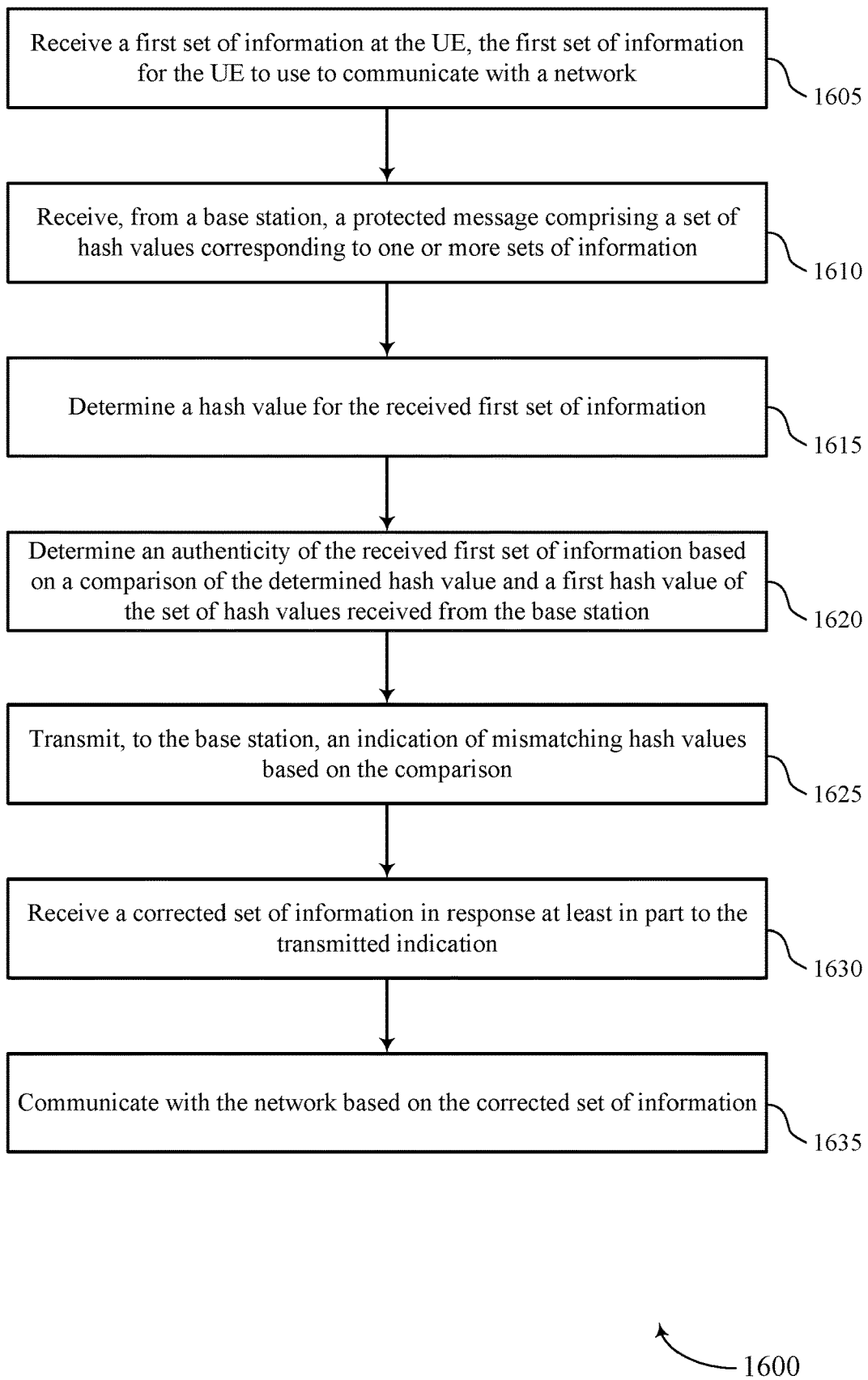

FIG. 16 shows a flowchart illustrating a method 1600 that supports detection of system information modification using AS SMC in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a first set of information at the UE, the first set of information for the UE to use to communicate with a network. The operations of 1605 may be performed according to the methods described herein. In some examples, aspects of the operations of 1605 may be performed by a network information manager as described with reference to FIGS. 6 through 9.

At 1610, the UE may receive, from a base station, a protected message including a set of hash values corresponding to one or more sets of information. The operations of 1610 may be performed according to the methods described herein. In some examples, aspects of the operations of 1610 may be performed by a hash value manager as described with reference to FIGS. 6 through 9.

At 1615, the UE may determine a hash value for the received first set of information. The operations of 1615 may be performed according to the methods described herein. In some examples, aspects of the operations of 1615 may be performed by a hash value manager as described with reference to FIGS. 6 through 9.

At 1620, the UE may determine an authenticity of the received first set of information based on a comparison of the determined hash value and a first hash value of the set of hash values received from the base station (e.g., the first hash value corresponding to the first set of information). The operations of 1620 may be performed according to the methods described herein. In some examples, aspects of the operations of 1620 may be performed by an authentication component as described with reference to FIGS. 6 through 9.

At 1625, the UE may transmit, to the base station, an indication of mismatching hash values based on the comparison. The operations of 1625 may be performed according to the methods described herein. In some examples, aspects of the operations of 1625 may be performed by an authentication component as described with reference to FIGS. 6 through 9.

At 1630, the UE may receive a corrected set of information in response at least in part to the transmitted indication. The operations of 1630 may be performed according to the methods described herein. In some examples, aspects of the operations of 1630 may be performed by a corrected network information manager as described with reference to FIGS. 6 through 9.

At 1635, the UE may communicate with the network based on the corrected set of information (e.g., as the first set of information sent by, for example, an attacker may not be authenticated based on the mismatching hash values). The operations of 1635 may be performed according to the methods described herein. In some examples, aspects of the operations of 1635 may be performed by a communication component as described with reference to FIGS. 6 through 9.

Figure 17:
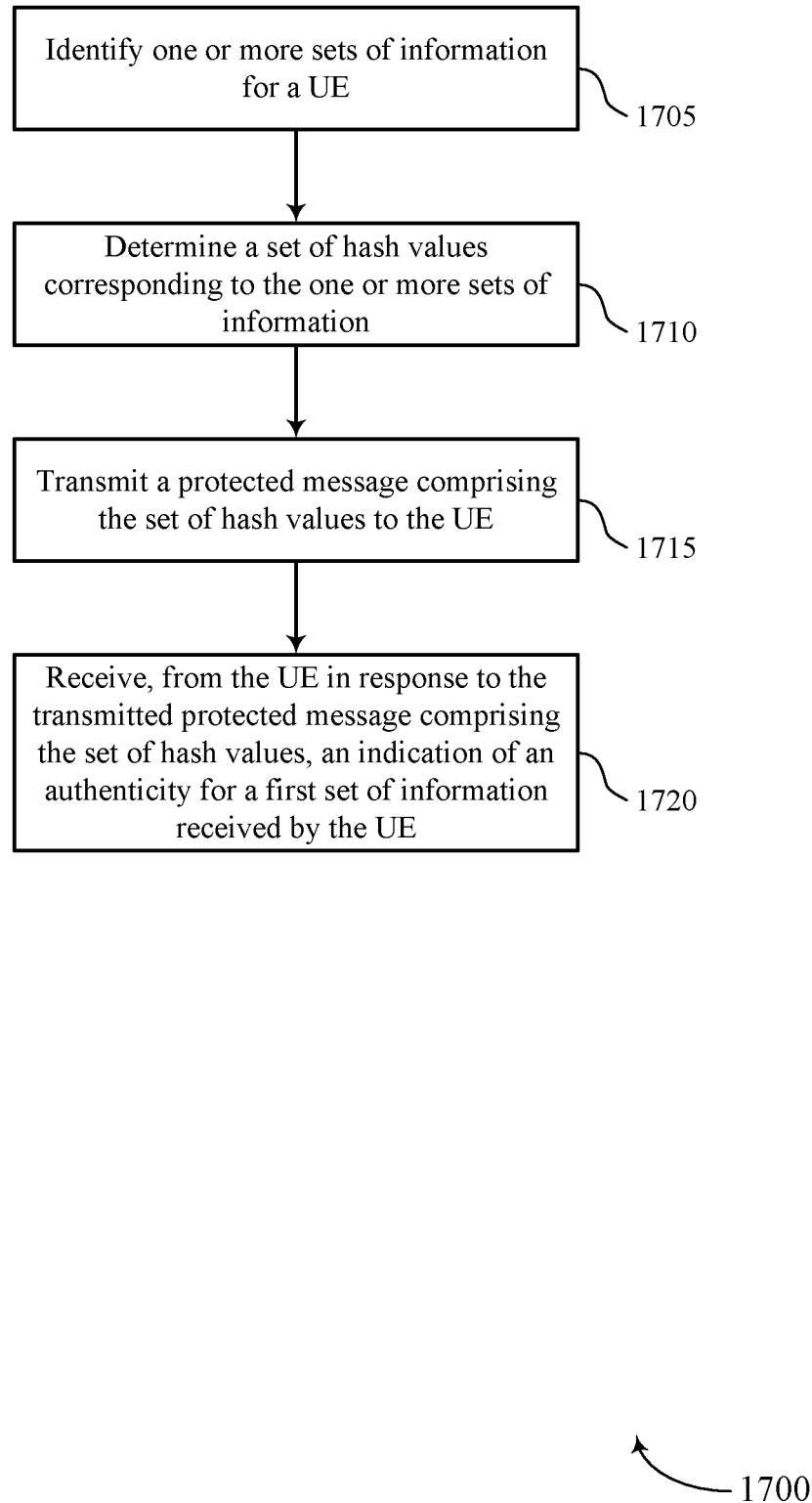

FIG. 17 shows a flowchart illustrating a method 1700 that supports detection of system information modification using AS SMC in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify one or more sets of information for a UE. The operations of 1705 may be performed according to the methods described herein. In some examples, aspects of the operations of 1705 may be performed by a network information manager as described with reference to FIGS. 10 through 13.

At 1710, the base station may determine a set of hash values corresponding to the one or more sets of information. The operations of 1710 may be performed according to the methods described herein. In some examples, aspects of the operations of 1710 may be performed by a hash value manager as described with reference to FIGS. 10 through 13.

At 1715, the base station may transmit a protected message comprising the set of hash values to the UE. The operations of 1715 may be performed according to the methods described herein. In some examples, aspects of the operations of 1715 may be performed by a hash value manager as described with reference to FIGS. 10 through 13.

At 1720, the base station may receive, from the UE in response to the transmitted protected message comprising the set of hash values, an indication of an authenticity for a first set of information received by the UE. The operations of 1720 may be performed according to the methods described herein. In some examples, aspects of the operations of 1720 may be performed by an authentication component as described with reference to FIGS. 10 through 13.

Figure 18:
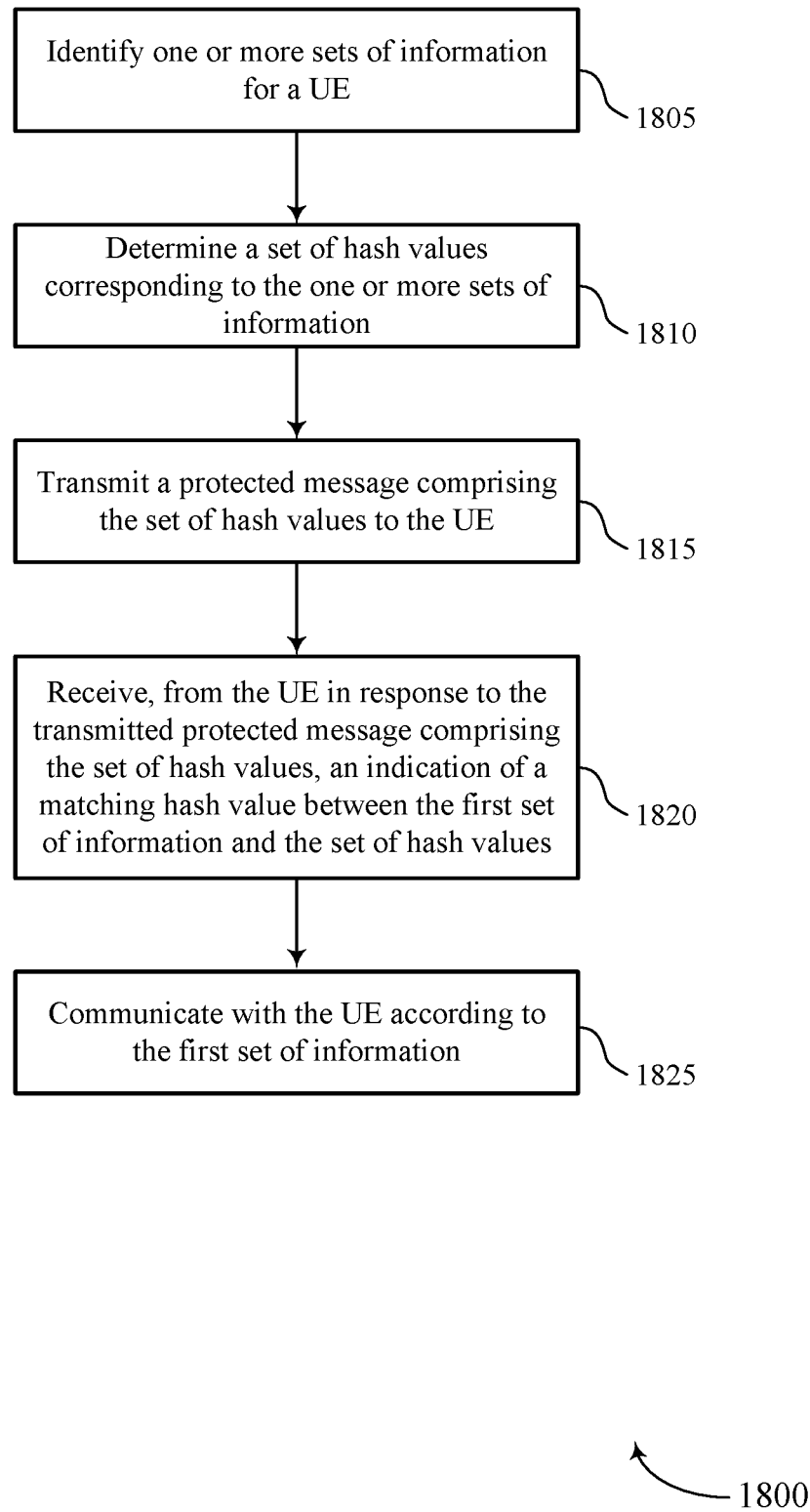

FIG. 18 shows a flowchart illustrating a method 1800 that supports detection of system information modification using AS SMC in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may identify one or more sets of information for a UE. The operations of 1805 may be performed according to the methods described herein. In some examples, aspects of the operations of 1805 may be performed by a network information manager as described with reference to FIGS. 10 through 13.

At 1810, the base station may determine a set of hash values corresponding to the one or more sets of information. The operations of 1810 may be performed according to the methods described herein. In some examples, aspects of the operations of 1810 may be performed by a hash value manager as described with reference to FIGS. 10 through 13.

At 1815, the base station may transmit a protected message comprising the set of hash values to the UE. The operations of 1815 may be performed according to the methods described herein. In some examples, aspects of the operations of 1815 may be performed by a hash value manager as described with reference to FIGS. 10 through 13.

At 1820, the base station may receive, from the UE in response to the transmitted protected message comprising the set of hash values, an indication of a matching hash value between the first set of information and the set of hash values. The operations of 1820 may be performed according to the methods described herein. In some examples, aspects of the operations of 1820 may be performed by an authentication component as described with reference to FIGS. 10 through 13.

At 1825, the base station may communicate with the UE according to the first set of information. The operations of 1825 may be performed according to the methods described herein. In some examples, aspects of the operations of 1825 may be performed by a communication component as described with reference to FIGS. 10 through 13.

Figure 19:
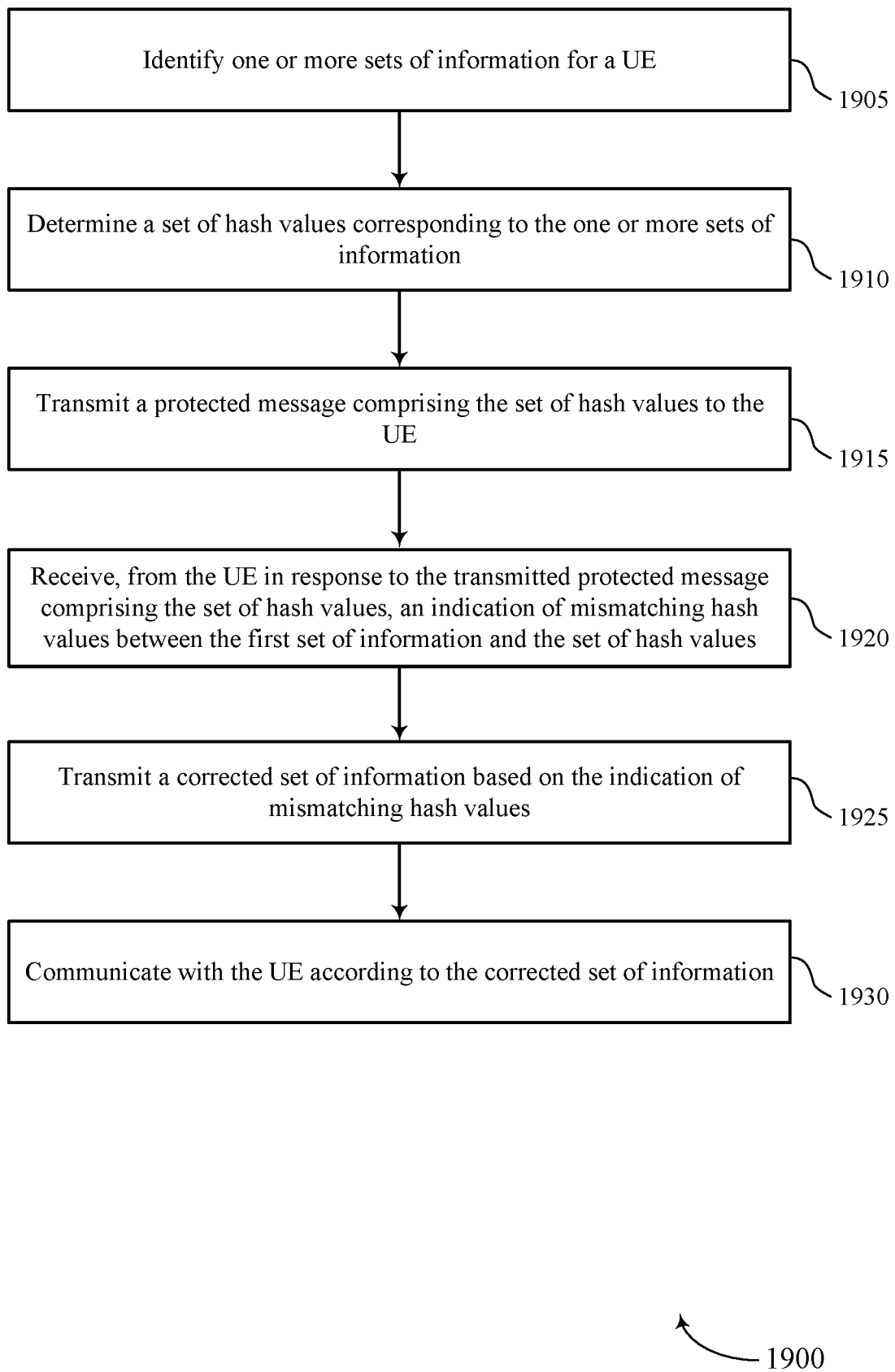

FIG. 19 shows a flowchart illustrating a method 1900 that supports detection of system information modification using AS SMC in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may identify one or more sets of information for a UE. The operations of 1905 may be performed according to the methods described herein. In some examples, aspects of the operations of 1905 may be performed by a network information manager as described with reference to FIGS. 10 through 13.

At 1910, the base station may determine a set of hash values corresponding to the one or more sets of information. The operations of 1910 may be performed according to the methods described herein. In some examples, aspects of the operations of 1910 may be performed by a hash value manager as described with reference to FIGS. 10 through 13.

At 1915, the base station may transmit a protected message comprising the set of hash values to the UE. The operations of 1915 may be performed according to the methods described herein. In some examples, aspects of the operations of 1915 may be performed by a hash value manager as described with reference to FIGS. 10 through 13.

At 1920, the base station may receive, from the UE in response to the transmitted protected message comprising the set of hash values, an indication of mismatching hash values between the first set of information and the set of hash values. The operations of 1920 may be performed according to the methods described herein. In some examples, aspects of the operations of 1920 may be performed by an authentication component as described with reference to FIGS. 10 through 13.

At 1925, the base station may transmit a corrected set of information based on the indication of mismatching hash values. The operations of 1925 may be performed according to the methods described herein. In some examples, aspects of the operations of 1925 may be performed by a corrected network information manager as described with reference to FIGS. 10 through 13.

At 1930, the base station may communicate with the UE according to the corrected set of information. The operations of 1930 may be performed according to the methods described herein. In some examples, aspects of the operations of 1930 may be performed by a communication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a first set of information at the UE, the first set of information for the UE to use to communicate with a network;
   receiving, from a base station, a protected message comprising a set of hash values corresponding to one or more sets of information;
   determining a hash value for the received first set of information;
   determining an authenticity of the received first set of information based at least in part on a comparison, by the UE, of the determined hash value and a first hash value of the set of hash values received from the base station, the first hash value corresponding to the first set of information; and
   transmitting, to the base station, an indication of the determined authenticity.

2. The method of claim 1, wherein:
   transmitting the indication of the determined authenticity comprises transmitting, to the base station, an indication of a matching hash value based at least in part on the comparison; and
   the method further comprises communicating with the network based at least in part on the received first set of information.

3. The method of claim 1, wherein:
   transmitting the indication of the determined authenticity comprises transmitting, to the base station, an indication of mismatching hash values based at least in part on the comparison; and
   the method further comprises:
      receiving a corrected set of information in response at least in part to the transmitted indication; and
      communicating with the network based at least in part on the corrected set of information.

4. The method of claim 3, wherein the corrected set of information is protected via ciphering, integrity protection, or a combination thereof.

5. The method of claim 3, wherein the corrected set of information is received in a radio resource control reconfiguration message.

6. The method of claim 3, wherein the indication of mismatching hash values is transmitted in an access stratum security mode complete message.

7. The method of claim 1, further comprising:
transmitting, to the base station, a radio resource control setup message comprising a registration request or a service request, wherein the protected message comprising the set of hash values is received in response at least in part to the registration request or the service request.

8. The method of claim 7, further comprising:
performing an authentication procedure with the network based at least in part on the transmitted radio resource control setup message, wherein the protected message comprising the set of hash values is received based at least in part on the performed authentication procedure.

9. The method of claim 1, wherein determining the authenticity of the received first set of information further comprises:
comparing the determined hash value and the first hash value of the set of hash values received from the base station based at least in part on a freshness parameter associated with the received first set of information.

10. The method of claim 1, further comprising:
identifying the first hash value of the set of hash values received from the base station based at least in part on the received first set of information.

11. The method of claim 10, wherein the first hash value comprises a single hash value corresponding to the received first set of information, the received first set of information comprising a single system information block.

12. The method of claim 10, wherein the first hash value comprises a single hash value corresponding to the received first set of information, the received first set of information comprising at least two system information blocks.

13. The method of claim 10, further comprising:
identifying a second hash value of the set of hash values received from the base station based at least in part on the received first set of information, wherein the first hash value corresponds to a first system information block of the received first set of information and the second hash value corresponds to a second system information block of the received first set of information.

14. The method of claim 1, further comprising:
receiving a non-access stratum message, wherein the set of hash values corresponding to the one or more sets of information is received based at least in part on the received non-access stratum message.

15. The method of claim 14, wherein the non-access stratum message comprises a registration accept message.

16. The method of claim 1, further comprising:
receiving a service accept message, wherein the set of hash values corresponding to the one or more sets of information is received based at least in part on the received service accept message.

17. The method of claim 1, further comprising:
performing a random access message exchange with the base station; and
transmitting a registration request or a service request to the base station following the random access message exchange, wherein the protected message comprising the set of hash values is received in response at least in part to the registration request or the service request.

18. The method of claim 1, further comprising:
receiving a first radio resource control message in response to the transmitted indication of the determined authenticity;
transmitting a second radio resource control message in response to the received first radio resource control message;
receiving, from the network, a registration accept message comprising a UE-specific key for initial access stratum security; and
communicating with the network based at least in part on the UE-specific key.

19. The method of claim 1, wherein the one or more sets of information comprise a system information block, or a master information block, or a combination thereof.

20. The method of claim 1, wherein receiving the protected message comprising the set of hash values from the base station comprises:
receiving an access stratum security mode command comprising the set of hash values corresponding to the one or more sets of information.

21. A method for wireless communication at a base station, comprising:
identifying one or more sets of information for a user equipment (UE);
determining a set of hash values corresponding to the one or more sets of information;
transmitting a protected message comprising the set of hash values to the UE; and
receiving, from the UE in response to the transmitted protected message comprising the set of hash values, an indication of an authenticity for a first set of information received by the UE.

22. The method of claim 21, wherein:
receiving the indication of the authenticity comprises receiving, from the UE, an indication of a matching hash value between the first set of information and the set of hash values; and
the method further comprises communicating with the UE based according to the first set of information.

23. The method of claim 21, wherein:
receiving the indication of the authenticity comprises receiving, from the UE, an indication of mismatching hash values between the first set of information and the set of hash values; and
the method further comprises:
transmitting a corrected set of information based at least in part on the indication of mismatching hash values; and
communicating with the UE according to the corrected set of information.

24. The method of claim 23, wherein the corrected set of information is protected via ciphering, integrity protection, or a combination thereof.

25. The method of claim 23, wherein the corrected set of information is transmitted in a radio resource control reconfiguration message.

26. The method of claim 23, wherein the indication of mismatching hash values is received in an access stratum security mode complete message.

27. The method of claim 21, further comprising:
receiving, from the UE, a radio resource control setup message comprising a registration request or a service request, wherein the protected message comprising the set of hash values is transmitted to the UE in response at least in part to the registration request or the service request.

28. The method of claim 27, further comprising:
transmitting the registration request or the service request to a network via the base station;
receiving, from the network, a UE-specific key based at least in part on the transmitted registration request or the transmitted service request; and
performing a security establishment procedure with the UE, wherein the protected message comprising the set of hash values is transmitted based at least in part on the performed security establishment procedure.

29. The method of claim 21, further comprising:
transmitting a non-access stratum message, wherein the protected message comprising the set of hash values is transmitted based at least in part on the transmitted non-access stratum message.

30. The method of claim 29, wherein the non-access stratum message comprises a registration accept message.

31. The method of claim 21, further comprising:
transmitting a service accept message, wherein the protected message comprising the set of hash values is transmitted based at least in part on the transmitted service accept message.

32. The method of claim 21, further comprising:
performing a random access message exchange with the UE; and
receiving a registration request or a service request from the UE following the random access message exchange, wherein the protected message comprising the set of hash values is transmitted in response at least in part to the registration request or the service request.

33. The method of claim 21, further comprising:
transmitting a first radio resource control message in response to the received indication of the authenticity;
receiving a second radio resource control message in response to the transmitted first radio resource control message;
transmitting a registration accept message comprising a UE-specific key for initial access stratum security; and
communicating with the UE based at least in part on the UE-specific key.

34. The method of claim 21, wherein the one or more sets of information comprise one or more system information blocks, a master information block, or a combination thereof.

35. The method of claim 21, wherein determining the set of hash values corresponding to the one or more sets of information comprises:
determining a first hash value of the set of hash values that corresponds to the first set of information, the first set of information comprising a first system information block.

36. The method of claim 35, wherein determining the set of hash values corresponding to the one or more sets of information further comprises:
determining a second hash value of the set of hash values that corresponds to a second set of information, the second set of information comprising a second system information block.

37. The method of claim 21, wherein determining the set of hash values corresponding to the one or more sets of information comprises:
determining a first hash value of the set of hash values that corresponds to the first set of information, the first set of information comprising at least two system information blocks.

38. The method of claim 21, wherein transmitting the protected message comprising the set of hash values to the UE comprises:
transmitting an access stratum security mode command to the UE, the access stratum security mode command comprising the set of hash values corresponding to the one or more sets of information.

39. An apparatus for wireless communication at a user equipment (UE), comprising:
a processor;
memory in electronic communication with the processor; and
instructions stored in the memory and executable by the processor to cause the apparatus to:
receive a first set of information at the UE, the first set of information for the UE to use to communicate with a network;
receive, from a base station, a protected message comprising a set of hash values corresponding to one or more sets of information;
determine a hash value for the received first set of information;
determine an authenticity of the received first set of information based at least in part on a comparison, by the UE, of the determined hash value and a first hash value of the set of hash values received from the base station, the first hash value corresponding to the first set of information; and
transmit, to the base station, an indication of the determined authenticity.

40. The apparatus of claim 39, wherein the instructions to transmit the indication of the determined authenticity are executable by the processor to cause the apparatus to:
transmit, to the base station, an indication of a matching hash value based at least in part on the comparison.

41. The apparatus of claim 39, wherein the instructions to transmit the indication of the determined authenticity are executable by the processor to cause the apparatus to:
transmit, to the base station, an indication of mismatching hash values based at least in part on the comparison.

42. The apparatus of claim 39, wherein the instructions are further executable by the processor to cause the apparatus to:
transmit, to the base station, a radio resource control setup message comprising a registration request or a service request, wherein the set of hash values is received in response at least in part to the registration request or the service request.

43. The apparatus of claim 39, wherein the instructions to determine the authenticity of the received first set of information further are executable by the processor to cause the apparatus to:
compare the determined hash value and the first hash value of the set of hash values received from the base station based at least in part on a freshness parameter associated with the received first set of information.

44. The apparatus of claim 39, wherein the instructions are further executable by the processor to cause the apparatus to:
identify the first hash value of the set of hash values received from the base station based at least in part on the received first set of information.

45. The apparatus of claim 39, wherein the instructions are further executable by the processor to cause the apparatus to:
receive a non-access stratum message, wherein the set of hash values corresponding to the one or more sets of information is received based at least in part on the received non-access stratum message.

46. The apparatus of claim 39, wherein the instructions are further executable by the processor to cause the apparatus to:
receive a service accept message, wherein the set of hash values corresponding to the one or more sets of information is received based at least in part on the received service accept message.

47. The apparatus of claim 39, wherein the instructions are further executable by the processor to cause the apparatus to:
perform a random access message exchange with the base station; and
transmit a registration request or a service request to the base station following the random access message exchange, wherein the protected message comprising the set of hash values is received in response at least in part to the registration request or the service request.

48. The apparatus of claim 39, wherein the instructions are further executable by the processor to cause the apparatus to:
receive a first radio resource control message in response to the transmitted indication of the determined authenticity;
transmit a second radio resource control message in response to the received first radio resource control message;
receive, from the network, a registration accept message comprising a UE-specific key for initial access stratum security; and
communicate with the network based at least in part on the UE-specific key.

49. The apparatus of claim 39, wherein the one or more sets of information comprise a system information block, or a master information block, or a combination thereof.

50. The apparatus of claim 39, wherein the instructions to receive the protected message comprising the set of hash values from the base station further are executable by the processor to cause the apparatus to:
receive an access stratum security mode command comprising the set of hash values corresponding to the one or more sets of information.

51. An apparatus for wireless communication at a base station, comprising:
a processor;
memory in electronic communication with the processor; and
instructions stored in the memory and executable by the processor to cause the apparatus to:
identify one or more sets of information for a user equipment (UE);
determine a set of hash values corresponding to the one or more sets of information;
transmit a protected message comprising the set of hash values to the UE; and
receive, from the UE in response to the transmitted protected message comprising the set of hash values, an indication of an authenticity for a first set of information received by the UE.

52. The apparatus of claim 51, wherein the instructions to receive the indication of the authenticity are executable by the processor to cause the apparatus to:
receive, from the UE, an indication of a matching hash value between the first set of information and the set of hash values.

53. The apparatus of claim 51, wherein the instructions to receive the indication of the authenticity are executable by the processor to cause the apparatus to:
receive, from the UE, an indication of mismatching hash values between the first set of information and the set of hash values.

54. The apparatus of claim 51, wherein the instructions are further executable by the processor to cause the apparatus to:
receive, from the UE, a radio resource control setup message comprising a registration request or a service request, wherein the protected message comprising the set of hash values is transmitted to the UE in response at least in part to the registration request or the service request.

55. The apparatus of claim 51, wherein the instructions are further executable by the processor to cause the apparatus to:
transmit a non-access stratum message, wherein the protected message comprising the set of hash values is transmitted based at least in part on the transmitted non-access stratum message.

56. The apparatus of claim 51, wherein the instructions are further executable by the processor to cause the apparatus to:
transmit a service accept message, wherein the protected message comprising the set of hash values is transmitted based at least in part on the transmitted service accept message.

57. The apparatus of claim 51, wherein the instructions are further executable by the processor to cause the apparatus to:
perform a random access message exchange with the UE; and
receive a registration request or a service request from the UE following the random access message exchange, wherein the protected message comprising the set of hash values is transmitted in response at least in part to the registration request or the service request.

58. The apparatus of claim 51, wherein the instructions are further executable by the processor to cause the apparatus to:
transmit a first radio resource control message in response to the received indication of the authenticity;
receive a second radio resource control message in response to the transmitted first radio resource control message;
transmit a registration accept message comprising a UE-specific key for initial access stratum security; and
communicate with the UE based at least in part on the UE-specific key.

59. The apparatus of claim 51, wherein the one or more sets of information comprise one or more system information blocks, a master information block, or a combination thereof.

60. The apparatus of claim 51, wherein the instructions to determine the set of hash values corresponding to the one or more sets of information are executable by the processor to cause the apparatus to:
determine a first hash value of the set of hash values that corresponds to the first set of information, the first set of information comprising a first system information block.

61. The apparatus of claim 51, wherein the instructions to determine the set of hash values corresponding to the one or more sets of information are executable by the processor to cause the apparatus to:

determine a first hash value of the set of hash values that corresponds to the first set of information, the first set of information comprising at least two system information blocks.

62. The apparatus of claim 51, wherein the instructions to transmit the protected message comprising the set of hash values to the UE are executable by the processor to cause the apparatus to:
transmit an access stratum security mode command to the UE, the access stratum security mode command comprising the set of hash values corresponding to the one or more sets of information.

63. An apparatus for wireless communication at a user equipment (UE), comprising:
means for receiving a first set of information at the UE, the first set of information for the UE to use to communicate with a network;
means for receiving, from a base station, a protected message comprising a set of hash values corresponding to one or more sets of information;
means for determining a hash value for the received first set of information;
means for determining an authenticity of the received first set of information based at least in part on a comparison, by the UE, of the determined hash value and a first hash value of the set of hash values received from the base station, the first hash value corresponding to the first set of information; and
means for transmitting, to the base station, an indication of the determined authenticity.

64. An apparatus for wireless communication at a base station, comprising:
means for identifying one or more sets of information for a user equipment (UE);
means for determining a set of hash values corresponding to the one or more sets of information;
means for transmitting a protected message comprising the set of hash values to the UE; and
means for receiving, from the UE in response to the transmitted protected message comprising the set of hash values, an indication of an authenticity for a first set of information received by the UE.

65. A non-transitory computer-readable medium storing code for wireless communication at a user equipment (UE), the code comprising instructions executable by a processor to:
receive a first set of information at the UE, the first set of information for the UE to use to communicate with a network;
receive, from a base station, a protected message comprising a set of hash values corresponding to one or more sets of information;
determine a hash value for the received first set of information;
determine an authenticity of the received first set of information based at least in part on a comparison, by the UE, of the determined hash value and a first hash value of the set of hash values received from the base station, the first hash value corresponding to the first set of information; and
transmit, to the base station, an indication of the determined authenticity.

66. A non-transitory computer-readable medium storing code for wireless communication at a base station, the code comprising instructions executable by a processor to:
identify one or more sets of information for a user equipment (UE);
determine a set of hash values corresponding to the one or more sets of information;
transmit a protected message comprising the set of hash values to the UE; and
receive, from the UE in response to the transmitted protected message comprising the set of hash values, an indication of an authenticity for a first set of information received by the UE.

* * * * *